United States Patent
MacDonald

(10) Patent No.: US 9,823,701 B2
(45) Date of Patent: Nov. 21, 2017

(54) DIFFERENTIAL PRESSURE ATTACHMENT FOR AN ELECTRONIC DEVICE

(71) Applicant: Intel Corporation, Santa Clara, CA (US)

(72) Inventor: Mark MacDonald, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/150,728

(22) Filed: May 10, 2016

(65) Prior Publication Data

US 2016/0252934 A1 Sep. 1, 2016

Related U.S. Application Data

(63) Continuation of application No. 14/229,840, filed on Mar. 29, 2014, now Pat. No. 9,342,107.

(51) Int. Cl.
*G06F 1/16* (2006.01)
*G01L 19/00* (2006.01)
*H04B 5/00* (2006.01)

(52) U.S. Cl.
CPC ............ *G06F 1/1654* (2013.01); *G01L 19/00* (2013.01); *G06F 1/1616* (2013.01); *G06F 1/1626* (2013.01); *G06F 1/1669* (2013.01); *G06F 1/1679* (2013.01); *H04B 5/0031* (2013.01)

(58) Field of Classification Search
CPC ............ Y10T 29/49826; G06F 3/0202; G06F 2203/04809; G06F 3/016; G06F 3/0227; G06F 1/203; G06F 3/0216; G06F 3/0414; G06F 1/1679; B23Q 11/0046; F16B 47/006; H05K 5/0217; H05K 7/00
See application file for complete search history.

(56) References Cited

U.S. PATENT DOCUMENTS

| | | | |
|---|---|---|---|
| 7,086,452 B1 | 8/2006 | Senyk et al. | |
| 8,480,044 B2* | 7/2013 | Liao ........................ | F16B 47/00 248/205.5 |
| 8,488,314 B1* | 7/2013 | Ashcraft ............... | G06F 1/1679 312/223.1 |
| 9,128,672 B1* | 9/2015 | Loo ....................... | G06F 1/1633 |

(Continued)

OTHER PUBLICATIONS

U.S. Oct. 21, 2015 Restriction Requirement in U.S. Appl. No. 14/229,840, 5 pages.

(Continued)

*Primary Examiner* — James Wu
*Assistant Examiner* — Michael Matey
(74) *Attorney, Agent, or Firm* — Patent Capital Group

(57) ABSTRACT

Particular embodiments described herein provide for an electronic device that could include a keyboard portion, an attachment mechanism, and a pump located in the keyboard portion that creates a pressure differential in the attachment mechanism such that a display portion can be attached to the keyboard portion. Other particular embodiments described herein provide for an electronic device that could include a display portion, an attachment mechanism located on the display portion, and a pump located in the display portion that can create a pressure differential in the attachment mechanism such that the display portion can be attached to a surface or device.

18 Claims, 25 Drawing Sheets

(56) References Cited

U.S. PATENT DOCUMENTS

| | | |
|---|---|---|
| 9,342,107 B2 | 5/2016 | MacDonald et al. |
| 2006/0017699 A1 | 1/2006 | Brown |
| 2006/0279930 A1 | 12/2006 | Hata et al. |
| 2009/0072118 A1* | 3/2009 | Zheng ................ B60R 11/0258 248/683 |
| 2011/0058316 A1* | 3/2011 | Liu ........................ E05C 19/00 361/679.01 |
| 2012/0069503 A1 | 3/2012 | Lauder et al. |
| 2012/0118770 A1 | 5/2012 | Valls et al. |
| 2014/0035817 A1* | 2/2014 | Prociw .................. G06F 3/0488 345/168 |
| 2014/0054338 A1* | 2/2014 | Casagrande ............ B60R 11/02 224/275 |
| 2015/0070839 A1* | 3/2015 | Johnson ................ G06F 1/1626 361/679.56 |
| 2015/0277491 A1 | 10/2015 | Browning et al. |
| 2015/0277499 A1 | 10/2015 | MacDonald |

OTHER PUBLICATIONS

U.S. Jan. 15, 2016 Notice of Allowance in U.S. Appl. No. 14/229,840, 10 pages.

* cited by examiner

DIFFERENTIAL PRESSURE ATTACHMENT FOR AN ELECTRONIC DEVICE

RELATED APPLICATION

This Application is a continuation (and claims the benefit of priority under 35 U.S.C. §120) of U.S. application Ser. No. 14/229,840, filed Mar. 29, 2014, entitled "DIFFERENTIAL PRESSURE ATTACHMENT FOR AN ELECTRONIC DEVICE," Inventor Mark MacDonald. The disclosure of the prior application is considered part of (and is incorporated in its entirety by reference in) the disclosure of this application.

FIELD OF THE DISCLOSURE

Embodiments described herein generally relate to the field of electronic devices, and more particularly, to differential pressure attachment mechanisms for an electronic device.

BACKGROUND

End users have more electronic device choices than ever before. A number of prominent technological trends are currently afoot (e.g., more computing devices, more detachable displays, etc.), and these trends are changing the electronic device landscape. One of the technological trends is a convertible or hybrid laptop. The convertible laptop is any type of computer system that has a detachable display or tablet and can essentially function as either a laptop or a tablet computer. Current solutions often rely on mechanical latches or powerful magnets to connect the display to the base when docked or connected. In many instances, these mechanisms can be bulky, complex, expensive, and with significant industrial design implications (e.g., holes, tabs, and prongs protruding from the form factor). In addition, many of the hinge solutions only support a landscape (horizontal) mode, but cannot support a portrait (vertical) mode. Hence, there is a challenge in providing an electronic device that allows the display to be in either a landscape configuration or a portrait configuration that is not bulky, complex, or difficult to use.

BRIEF DESCRIPTION OF THE DRAWINGS

Embodiments are illustrated by way of example and not by way of limitation in the FIGURES of the accompanying drawings, in which like references indicate similar elements and in which.

Figure 1A:
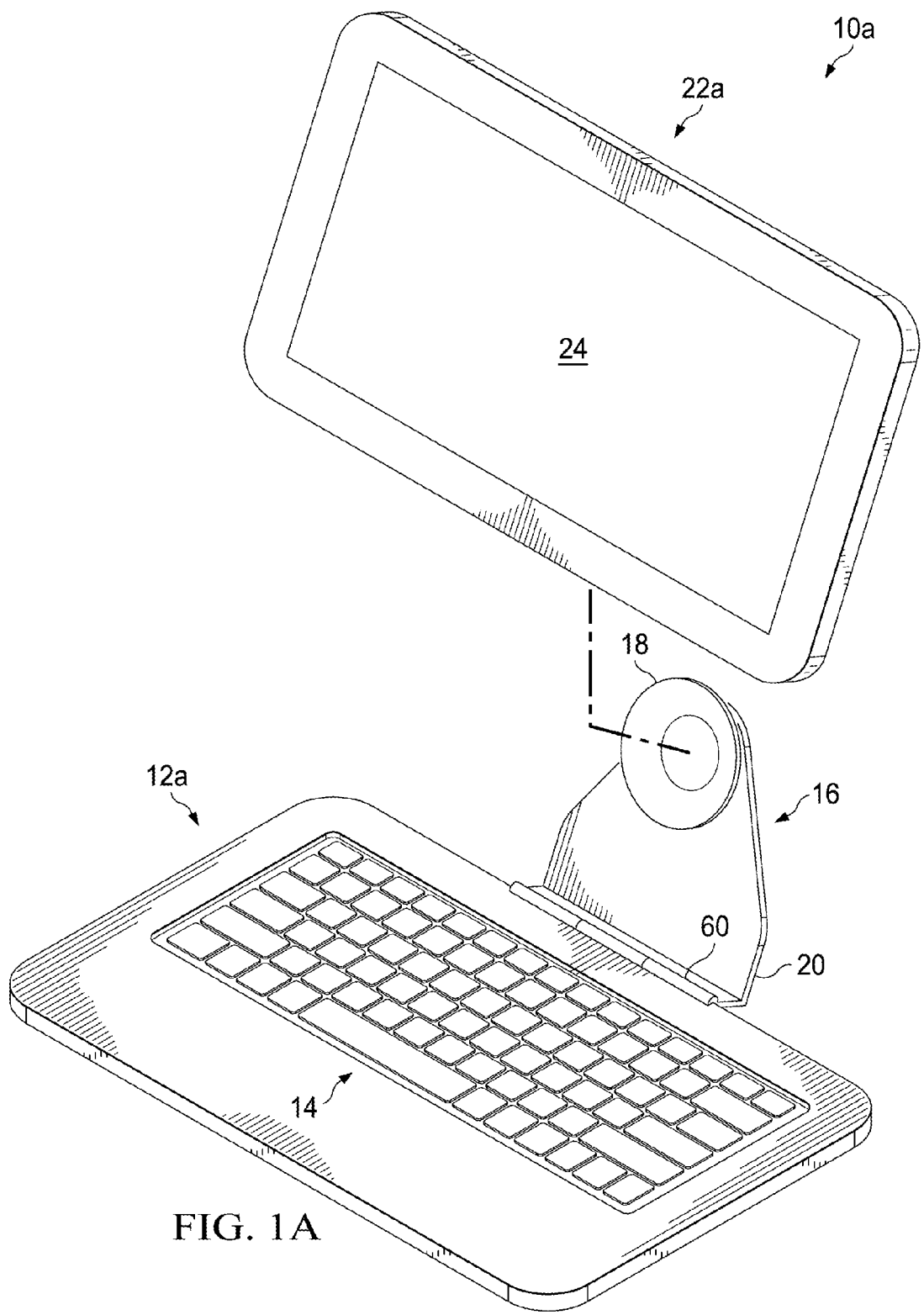
FIG. 1A is a simplified orthographic view illustrating an embodiment of an electronic device, in accordance with one embodiment of the present disclosure.

The FIGURES of the drawings are not necessarily drawn to scale, as their dimensions can be varied considerably without departing from the scope of the present disclosure.

DETAILED DESCRIPTION OF THE EMBODIMENTS

Overview

In an example, there is disclosed a system, an apparatus, and a method for a differential pressure hinge design. In one example embodiment, an electronic device is provided and includes a keyboard portion, an attachment mechanism, and a pump located in the keyboard portion that creates a pressure differential in the attachment mechanism such that a display portion can be attached to the keyboard portion. The attachment mechanism may be located on a display support that connects to a hinge on the keyboard portion. Also, the display portion may include a display attachment area on the display portion and the display attachment area can accommodate the attachment mechanism. A pressure sensor in the attachment mechanism can activate the pump to increase the pressure differential in the attachment mechanism when the pressure differential is below a threshold.

In another embodiment, an attachment mechanism is located on the display portion and a pump located in the display portion can create a pressure differential in the attachment mechanism such that the display portion can be attached to a surface. The surface may be a device such as a keyboard portion, a vertical wall, or some other surface. The surface may be smooth such that a good pressure differential can be obtained. The display portion can include a plurality of attachment mechanisms and a plurality of pumps where each pump can create the pressure differential in at least one of the plurality of attachment mechanisms. In other examples, the display portion includes a second attachment mechanism that allows the display portion to be attached to the keyboard portion in a landscape configuration and a portrait configuration. Further, the display portion may include a hinge that can rotate at least ninety degrees such that the display portion can be relatively parallel to the keyboard portion or another surface.

Example Embodiments of the Disclosure

A convertible or hybrid laptop is any type of computer system that has a detachable display or tablet and can essentially function as either a laptop or a tablet computer. Typical modern convertible laptops have a complex joint between the keyboard housing and the display. Typically, the base of a tablet laptop attaches to the display at a single joint called a swivel hinge or rotating hinge or through various other hinges, slots, supports, etc. Some convertible or hybrid laptop laptops incorporate a removable keyboard base allowing the user to easily choose between functioning as a laptop with the keyboard attached or as a tablet device utilizing the touchscreen capabilities of the display.

Current convertible or hybrid laptop hinges often rely on mechanical latches or powerful magnets to connect the display to the base when docked or connected. In many instances, these mechanisms can be bulky, complex, expensive, and with significant industrial design implications (e.g., holes, tabs, and prongs protruding from the form factor). In addition, many of the hinge solutions only support a landscape (horizontal) mode, but cannot support a portrait (vertical) mode. Hence, there is a challenge in providing an electronic device that is not bulky, complex, or difficult to use. What is needed is a system and method that allows for a convertible or hybrid laptop hinge that does not sacrifice usability, performance, or cost, and that does not have significant industrial design implications. It would be beneficial if the system and method allowed the display to be in either a landscape configuration or a portrait configuration.

The foregoing is offered by way of non-limiting examples in which the system and method of the present specification may usefully be deployed. The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiment many have different advantages, and no particular advantage is necessarily required of any embodiment.

In the examples of the present specification, a system and method can be provided that allows for a convertible or hybrid laptop hinge without sacrificing usability, performance, cost, or significant industrial design implications. The system and method can also allow the display to be in either a landscape configuration or a portrait configuration.

In one example, a pump located in a keyboard portion creates a pressure differential in an attachment mechanism such that a display portion can be attached to the keyboard portion. The attachment mechanism can be located on a display support that connects to a hinge on the keyboard portion. The display portion can include a display attachment area that can accommodate the attachment mechanism and the display attachment area may include a sealing member. Further, the attachment mechanism may be located on the keyboard portion and allow the display portion to be attached in a landscape configuration or in a portrait configuration. In one example, a pressure sensor in the attachment mechanism can detect when the pressure differential is below a threshold and activate the pump to increase the pressure differential in the attachment mechanism.

In other examples, a pump is located in a display portion and the pump creates a pressure differential in an attachment mechanism such that the display portion can be attached to a surface. The surface can be a device such as the keyboard portion, a wall, table top, or some other surface where a user might want to attach the display portion. There may be a plurality of attachment mechanisms located on the display portion and a plurality of pumps where each pump can create the pressure differential in at least one of the plurality of attachment mechanisms. The display portion may include a second attachment mechanism that allows the display portion to be attached to the keyboard portion in a landscape configuration or to be attached to the keyboard portion in a portrait configuration. In another example, the attachment mechanism can be attached to a hinge and the hinge can rotate at least ninety degrees such that the display can be relatively parallel to the keyboard portion or another surface or device.

Example Embodiments

The following detailed description sets forth example embodiments of apparatuses, methods, and systems relating to suction attachment mechanisms for an electronic device. Features such as structure(s), function(s), and/or characteristic(s), for example, are described with reference to one embodiment as a matter of convenience; various embodiments may be implemented with any suitable one or more of the described features.

FIG. 1A is a simplified orthographic view illustrating an embodiment of an electronic device 10a in a detached configuration in accordance with one embodiment of the present disclosure. Electronic device 10a may include a keyboard portion 12a and a display portion 22a. Display portion 22a may include a display 24. Keyboard portion 12a may include a keyboard 14, a display attachment 16, and a hinge 60. Display attachment 16 may include an attachment mechanism 18 and a display support 20. Attachment mechanism 18 can be configured to provide a pressure differential force (or suction force) against display portion 22a. Display support 20 can be configured to support display portion 22a at a desired angle.

Hinge 60 can define an axis of rotation (or multiple axes of rotation) that is shared between keyboard portion 12a and display portion 22a and may include a printed circuit board (PCB) interconnector. In an embodiment, using hinge 60 and/or display attachment 16, an electrical current and signals can be passed between display portion 22a and keyboard portion 12a to recharge an on-board battery or capacitor, power any number of items (e.g., display 24, a wireless module, a camera, speakers, etc.), and provide a communication path between display portion 22a and keyboard portion 12a. In other examples, electrical current and signals can be passed through a plug-in connector (e.g., whose male side protrusion connects to display portion 22a and whose female side connects to keyboard portion 12a or vice-versa) or a wireless connector (e.g., Wi-Fi, Bluetooth, etc.). Note that any number of connectors (e.g., Universal Serial Bus (USB) connectors (e.g., in compliance with the USB 3.0 Specification released in November 2008), Thunderbolt™ connectors, a non-standard connection point such as a docking connector, etc.) can be provisioned in conjunction with electronic device 10a. [Thunderbolt™ and the Thunderbolt logo are trademarks of Intel Corporation in the U.S. and/or other countries.]. Virtually any other electrical connection methods could be used and, thus, are clearly within the scope of the present disclosure.

In an embodiment, an electronic device can be configured to use a pressure differential or suction force to attach a tablet (or display portion) to a base (or keyboard portion) of the electronic device. For example, a pressure differential force can be generated from a small pump located in the base and connected to an attachment mechanism on the base with a tube. The attachment mechanism can generally preserve a clean industrial design for the tablet portion as the attachment point should be relatively smooth and contiguous in order to create a good seal. A check valve or other device can be used to maintain the pressure differential after the attachment is complete and to prevent or mitigate against back flow. The check valve may be part of the pump (e.g., a pump with zero backflow) or may be located separate from the pump. In the event that the seal is imperfect, a pressure sensor could detect that the pressure differential is below a threshold and activate the pump to maintain the pressure differential. In another example, the pump could be reactivated periodically to maintain the pressure differential for the attachment as needed. In yet another example, the pump may be contained within the tablet which would allow the tablet to have an attachment mechanism or a plurality of attachment mechanisms and adhere to a device or surface.

In one or more embodiments, electronic device 10a (and 10b, tablets 62a and b, and dual orientation displays 72a and b discussed below) may be any suitable electronic device having a display such as a mobile device, a tablet computer and/or a tablet device (e.g., iPad™), a personal digital assistant (PDA), a smartphone, an audio system, a movie player of any type, a computer docking station, etc. Display 24 may be a liquid crystal display (LCD), organic light-emitting diode (OLED), or some other type of display. Electronic device 10a (and 10b, tablets 62a and b, and dual orientation displays 72a and b discussed below) can include a battery and various electronics (e.g., wireless module (e.g., Wi-Fi module, Bluetooth module, etc.) processor, memory, camera, a microphone, speakers, etc.) to allow electronic device to operate.

Figure 1B:
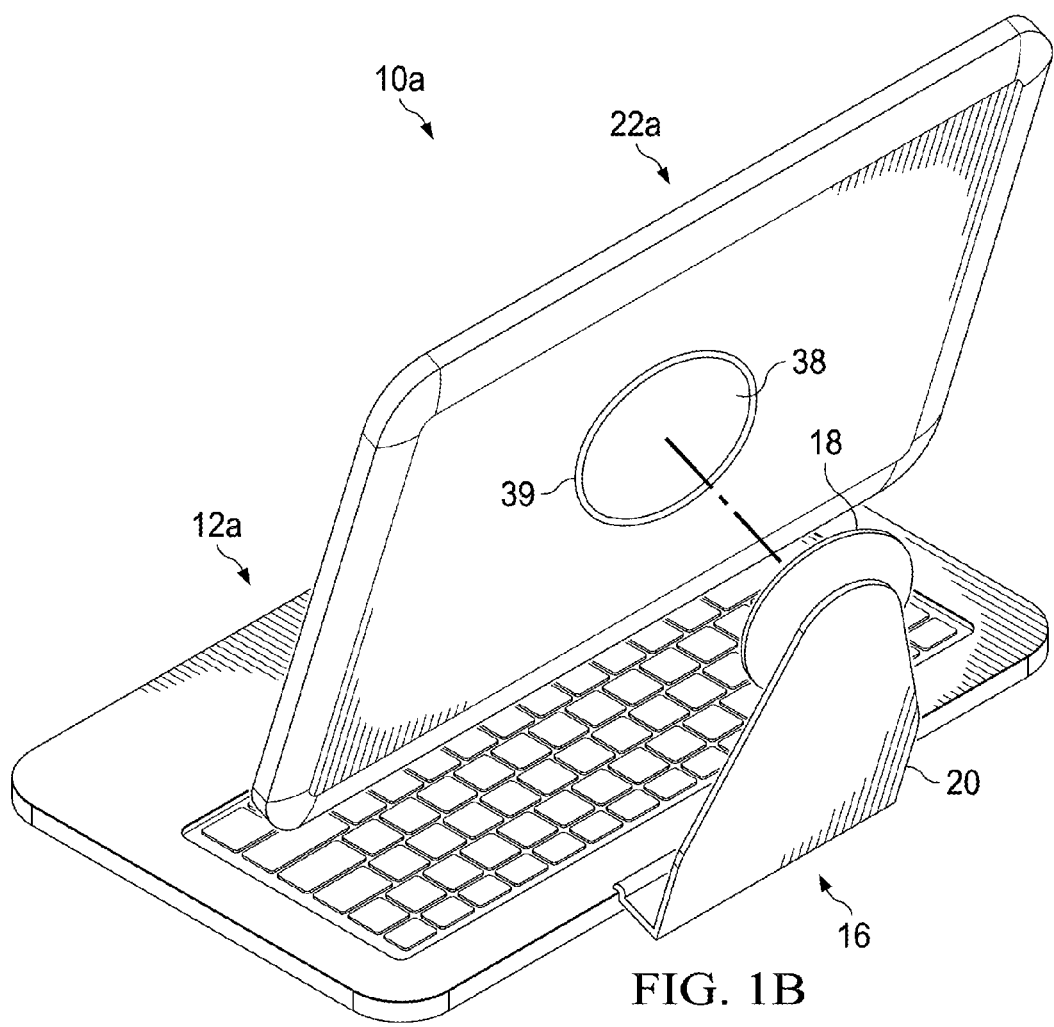
FIG. 1B is a simplified orthographic view illustrating an embodiment of an electronic device, in accordance with one embodiment of the present disclosure.

Turning to FIG. 1B, FIG. 1B is a simplified orthographic view illustrating display portion 22a being attached to keyboard portion 12a in accordance with one embodiment of the present disclosure. Display portion 22a may include a display attachment area 38. Display attachment area 38 can accommodate attachment mechanism 18 and display attachment area 38 may include a sealing member 39 (e.g., stiff o-ring, rubberized surface, etc.) to help facilitate a seal between attachment mechanism 18 and display attachment area 38.

Figure 1C:
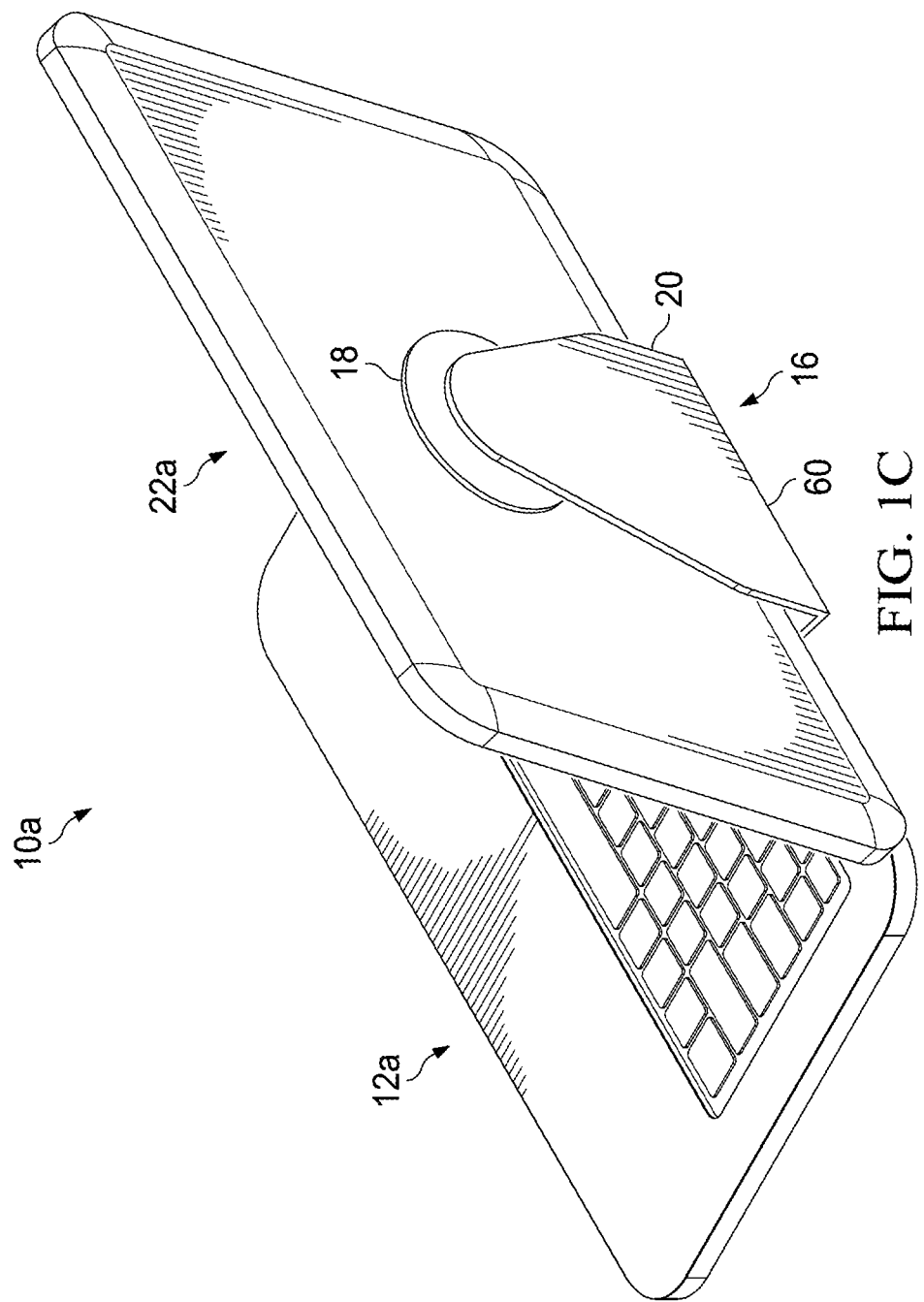
FIG. 1C is a simplified orthographic view illustrating an embodiment of an electronic device, in accordance with one embodiment of the present disclosure.
Figure 1D:
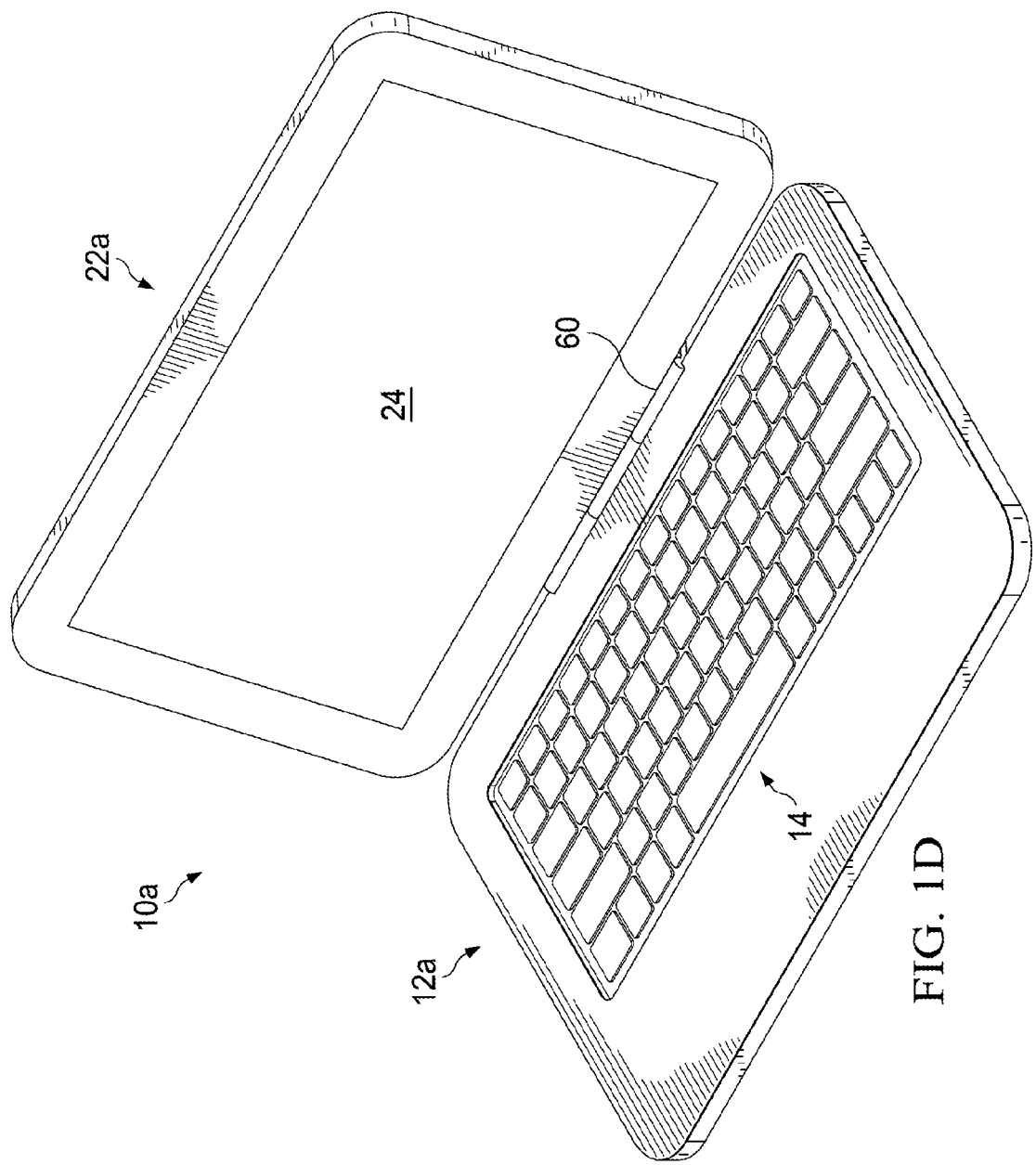
FIG. 1D is a simplified orthographic view illustrating an embodiment of an electronic device, in accordance with one embodiment of the present disclosure.
Figure 1E:
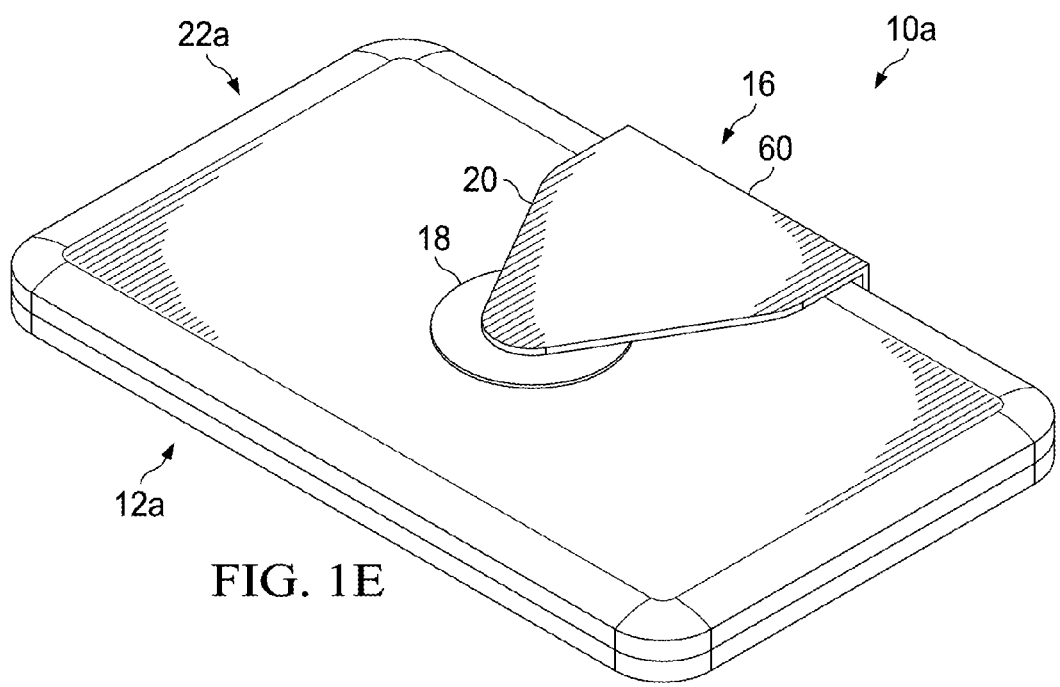
FIG. 1E is a simplified orthographic view illustrating an embodiment of an electronic device, in accordance with one embodiment of the present disclosure.

Turning to FIG. 1C, FIG. 1C is a simplified orthographic view illustrating display portion 22a attached to keyboard portion 12a in accordance with one embodiment of the present disclosure. In FIG. 1C, attachment mechanism 18 is secured to a display portion 22a and electronic device is in an open clamshell configuration. Turning to FIG. 1D, FIG. 1D is a simplified orthographic view illustrating display portion 22a attached to keyboard portion 12a in an open clamshell configuration in accordance with one embodiment of the present disclosure. Turning to FIG. 1E, FIG. 1E is a simplified orthographic view illustrating electronic device 10a in a closed clamshell configuration in accordance with one embodiment of the present disclosure.

The following information may be viewed as a basis from which one or more embodiments may be explained. Although the embodiments described are related to laptops, tablets, convertible laptops, hybrid laptops, etc. there may be other embodiments that deal with phone, PDAs, audio systems, etc.

A convertible computer, (e.g., a hybrid laptop, 2:1 detachable Ultrabook, etc.) is a mobile computer that can include a clamshell or laptop configuration and a tablet configuration. To convert from the clamshell configuration to the tablet configuration, often the tablet or display (e.g., display portion 22a) can be separated from a base or a keyboard (e.g., keyboard portion 12a). While convertible computers are a compelling way of delivering convertibility from a clamshell configuration to a tablet configuration, in some designs, the hinge can provide a negative user experience. Hinge and attachment mechanisms for convertible computers can be challenging to design. Existing solutions can be flimsy, bulky, and/or difficult to use and often rely on mechanical latches or powerful magnets to connect the tablet (or display portion) to the base (or keyboard portion)

when docked or connected. The mechanisms can be bulky, complex, expensive, and with significant industrial design implications (e.g., holes, tabs, and prongs protruding from the form factor).

In an embodiment, an electronic device can be configured to mitigate against bulky, complex, expensive, and significant industrial design implications without compromising the user experience by providing a thinner, lighter, less complexity around the hinge and docking points, simple one-handed hinge design. In a specific implementation, electronic device can use a pressure differential force to attach the tablet (or display portion) to the base (or keyboard portion) of the electronic device. For example, a suction force can be generated from a small pump located in the base and connected to the attachment location on the base with a fine tube. The small pump may be a small ultrasonic piezo pump or other pump that is quiet, requires low power (e.g., below 100 mW), has sufficient flow (e.g., around 100 s of mL/min), and can produce sufficient pressure to attach the tablet to the base. The sufficient pressure to attach the tablet to the base depends on the weight of the tablet and varies inversely with the total area used for the connection (e.g., for a typical tablet, about 5-10 PSI of pressure is needed for an attachment area of about 2-5 square inches). The attachment mechanism can generally preserve a clean industrial design for the tablet portion as the attachment point can be relatively smooth and contiguous in order to create a good seal. A small mechanical guide pattern or locating magnets may be used to help guide positioning of the attachment mechanism. The attach point could either be on a flat backside of the tablet or on any smooth edge of the tablet. A sealing member on or around the attachment area could facilitate a good repeatable seal (e.g., stiff o-ring, rubberized surface, etc.). If used, the sealing member may be a thin strip at the edge of the attachment area in order to provide a rigid mating connection (e.g., similar to a Bell Jar that rigidly and untilting attaches to a surface).

In an example use implementation, magnets may guide the tablet into the correct orientation. A proximity sensor, docking connector/pin, simple electrical path connection switch, etc. can detect the presence of the tablet and momentarily (e.g., less than 1 second) activate the pump. The resulting pressure differential can secure or clamp the tablet into place. A micro check valve can be used to maintain the pressure differential after the docking or connection is complete. In the event that the seal is imperfect, the pump could be reactivated periodically to maintain the connection as needed. With the typical dimensions of a 10 inch or larger display, this type of attachment connection could generate 10-50 lbs of attachment force (depending on industrial design and size of the attach area/edge) which can be enough to securely connect the tablet to the base. Using this configuration, the mechanical complexity of the attachment mechanism can be tucked remotely away in the base, allowing for slim, rigid design of the mating points. A one-handed release mechanism using a simple mechanical switch or some other mechanism could release the pressure differential in the attachment mechanism and allow the tablet to be removed from the base. In another example, the pump may be contained within the tablet which would allow the tablet to adhere to a surface or device.

Note that any of the attachment configurations, examples, or embodiments discussed herein may be of any appropriate shape and dimensions, where its construction could reflect an integral piece (e.g., of plastic, metal, fiber, any combination of these, etc.) or its construction could reflect a number of components being fit together. The attachment mechanism could have various sub-parts (e.g., two sub-parts on either end of the keyboard portion or the display portion). The components could be hidden from sight, or exposed. In certain implementations, the attachment mechanism could extend the length of the keyboard portion or the display portion, or it could be much smaller. It is imperative to note that any such alternatives and permutations are clearly within the broad scope of the present disclosure.

Figure 2A:
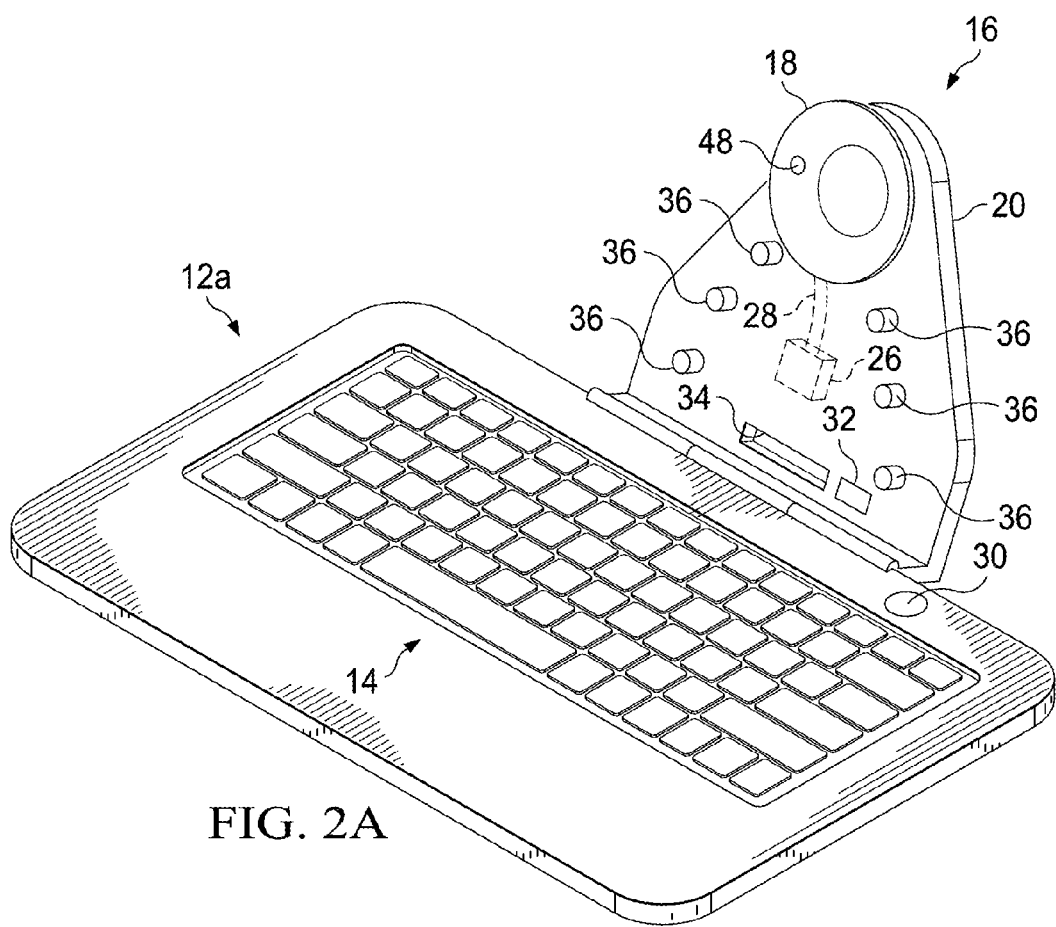
FIG. 2A is a simplified orthographic view illustrating an embodiment of a portion of an electronic device, in accordance with one embodiment of the present disclosure.

Turning to FIG. 2A, FIG. 2A is a simplified orthographic view illustrating keyboard portion 12a in accordance with one embodiment of the present disclosure. Keyboard portion 12a can include keyboard 14 and display attachment 16. Display attachment 16 can include attachment mechanism 18, display support 20, a pump 26, a pump tube 28, a release 30, a proximity sensor 32, a keyboard interconnect 34, a plurality of orientation guides 36, and a pressure sensor 48.

In an example, pump 26 may be a small ultrasonic piezo pump or other pump that is quiet, requires low power (e.g., below 100 mW), has sufficient flow (e.g., around 100 s of mL/min), and can produce sufficient pressure (e.g., about 5-10 PSI) to attach keyboard portion 12a to display portion 22a. Pump 26 can include a check valve to mitigate against any backflow or back pressure. In an embodiment, when display portion 22a is brought near or proximate to keyboard portion 12a, proximity sensor 32 can detect the presence of display portion 22a and activate pump 26. When pump 26 is activated, air can be drawn through pump tube 28 creating a pressure differential in attachment mechanism 18. The pressure differential can create a suction like force and can be used to attach keyboard portion 12a to display portion 22a. Pressure sensor 48 can detect when the pressure differential is below a threshold and activate pump 26 to maintain the pressure differential in attachment mechanism 18. When activated, release 30 can release the pressure differential and allow display portion 22a to be removed from keyboard portion 12a.

In an embodiment, plurality of orientation guides 36 may be magnets. Plurality of orientation guides 36 can help facilitate connecting keyboard portion 12a to display portion 22a and keep them connected together. One or more of plurality of orientation guides 36 may be rubber bumpers to mitigate against scuffing and to absorb any shock that may occur when keyboard portion 12a and display portion 22a are connected together. Keyboard interconnect 34 may be a PCB connection or interconnector, optical connection, or a wireless connection. The above features are described with reference to one embodiment as a matter of convenience; various embodiments may be implemented with any suitable one or more of the described features in various arrangements.

Figure 2B:
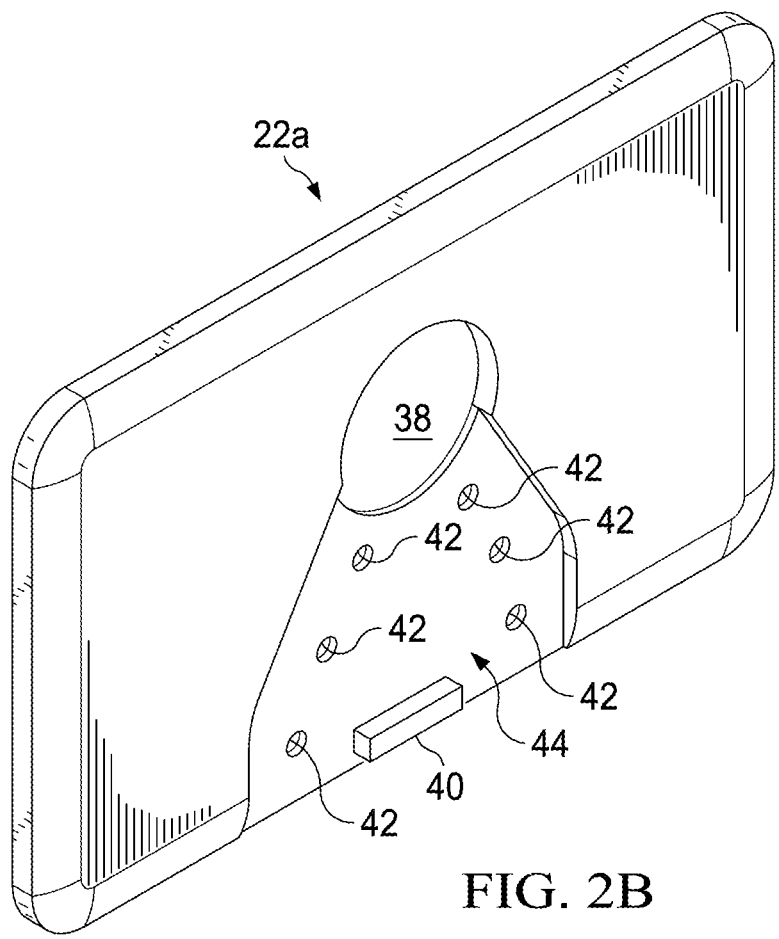
FIG. 2B is a simplified orthographic view illustrating an embodiment of a portion of an electronic device, in accordance with one embodiment of the present disclosure.

Turning to FIG. 2B, FIG. 2B is a simplified orthographic view illustrating display portion 22a in accordance with one embodiment of the present disclosure. Display portion 22a can include display attachment area 38, a display interconnect 40, a plurality of mating orientation guides 42, and a display support receiving area 44. Display support receiving area 44 may be recessed and have the same profile as display support 20 such that when keyboard portion 12a and display portion 22a are connected together, a relatively flat profile is created. Display interconnect 40 may be a PCB connection or interconnector, optical connection, or a wireless connection and can facilitate a connection with keyboard interconnect 34.

In an embodiment, an attractive force between plurality of orientation guides 36 and plurality of mating orientation guides 42 can be such that after the pressure differential is removed, a relatively small amount of force is required to remove keyboard portion 12a from display portion 22a (e.g., a user can remove keyboard portion 12a from display portion 22a with one hand). Plurality of orientation guides 36 and plurality of mating orientation guides 42 may be encased in electronic device 10a and provide a directional focus for a magnetic field created by plurality of orientation guides 36 and plurality of mating orientation guides 42. In addition, plurality of orientation guides 36 and plurality of mating orientation guides 42 may be accompanied by a suitable backing (e.g., a steel backing) to reduce unwanted stray magnetic fields. In a particular example implementation, rare earth magnets with alternating polarity and a steel back plate can be used to reduce stray magnetic fields and to concentrate the magnetic fields in a desired direction.

Figure 3A:
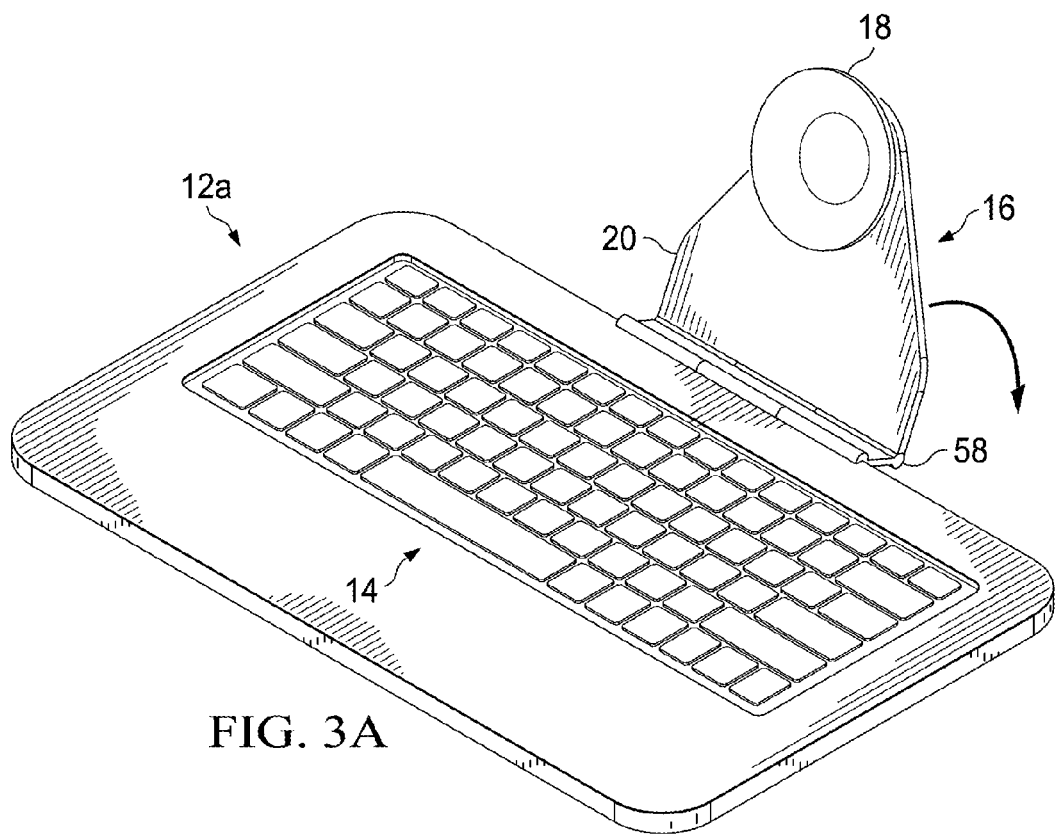
FIG. 3A is a simplified orthographic view illustrating an embodiment of a portion of an electronic device, in accordance with one embodiment of the present disclosure.

Turning to FIG. 3A, FIG. 3A is a simplified orthographic view illustrating a portion of electronic device 10a in accordance with one embodiment of the present disclosure. Keyboard portion 12a can include keyboard 14, display attachment 16, attachment mechanism 18, display support 20, and a dual axis hinge 58. Dual axis hinge 58 can define an axis of rotation (or multiple axes of rotation) that is shared between display portion 22a and keyboard portion 12a and allow display attachment 16 to rotate around keyboard portion 12a.

Figure 3B:
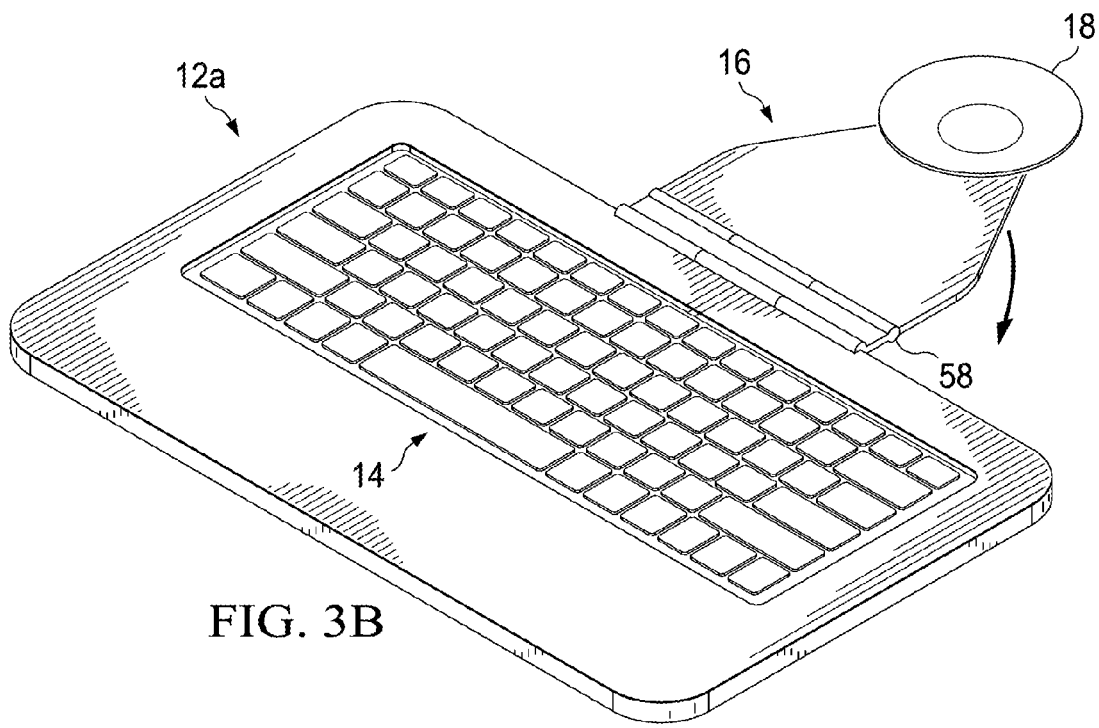
FIG. 3B is a simplified orthographic view illustrating an embodiment of a portion of an electronic device, in accordance with one embodiment of the present disclosure.
Figure 3C:
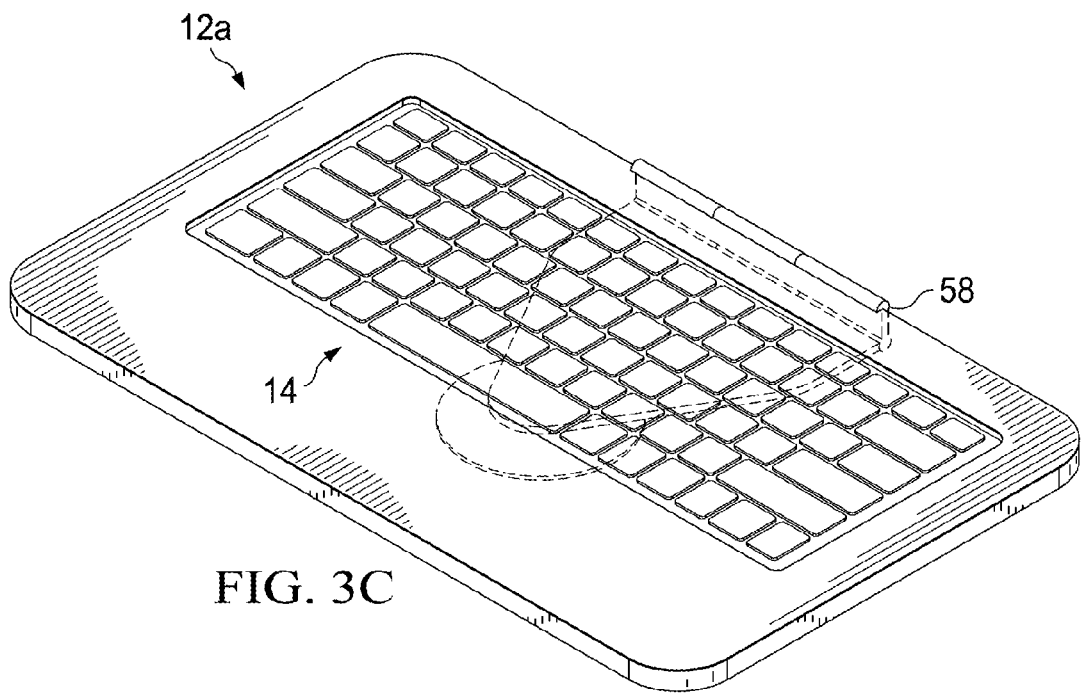
FIG. 3C is a simplified orthographic view illustrating an embodiment of a portion of an electronic device, in accordance with one embodiment of the present disclosure.

Turning to FIG. 3B, FIG. 3B is a simplified orthographic view illustrating a portion of electronic device 10a in accordance with one embodiment of the present disclosure. As illustrated in FIG. 3B, display attachment 16 has been rotated on dual axis hinge 58 such that display attachment 16 is in the same plane as keyboard portion 12a. Turning to FIG. 3C, FIG. 3C is a simplified orthographic view illustrating a portion of electronic device 10a in accordance with one embodiment of the present disclosure. As illustrated in FIG. 3C, display attachment 16 has been rotated on dual axis hinge 58 such that display attachment 16 is behind keyboard portion 12a.

Figure 3E:
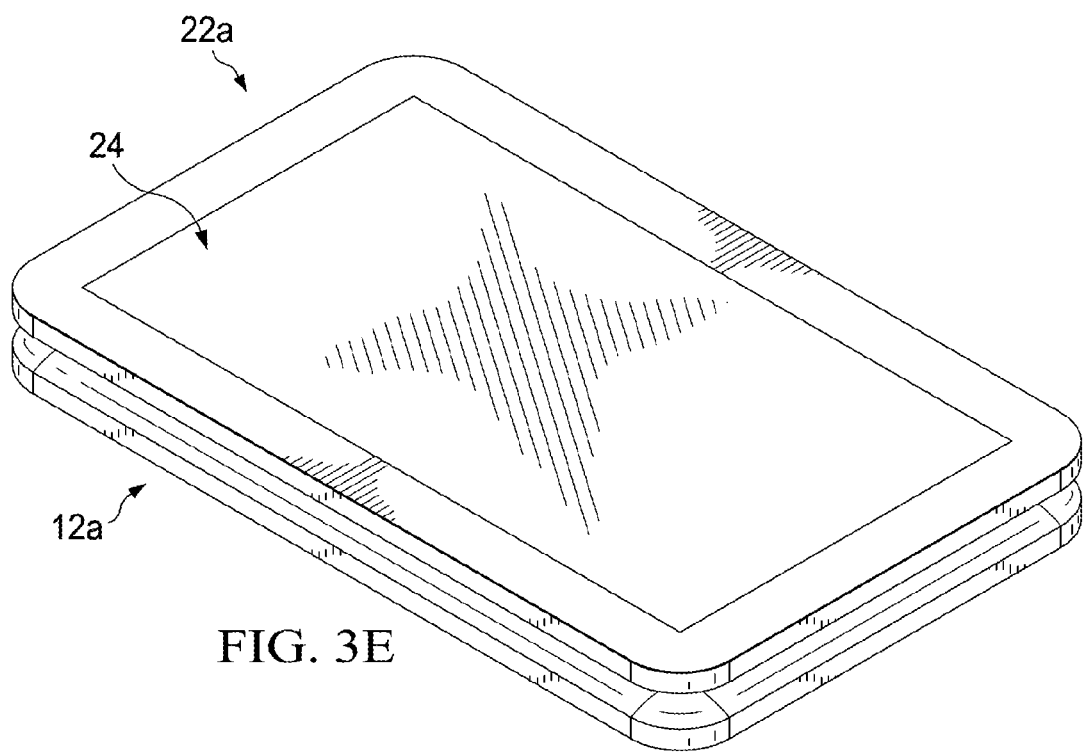
FIG. 3E is a simplified orthographic view illustrating an embodiment of an electronic device, in accordance with one embodiment of the present disclosure.
Figure 3D:
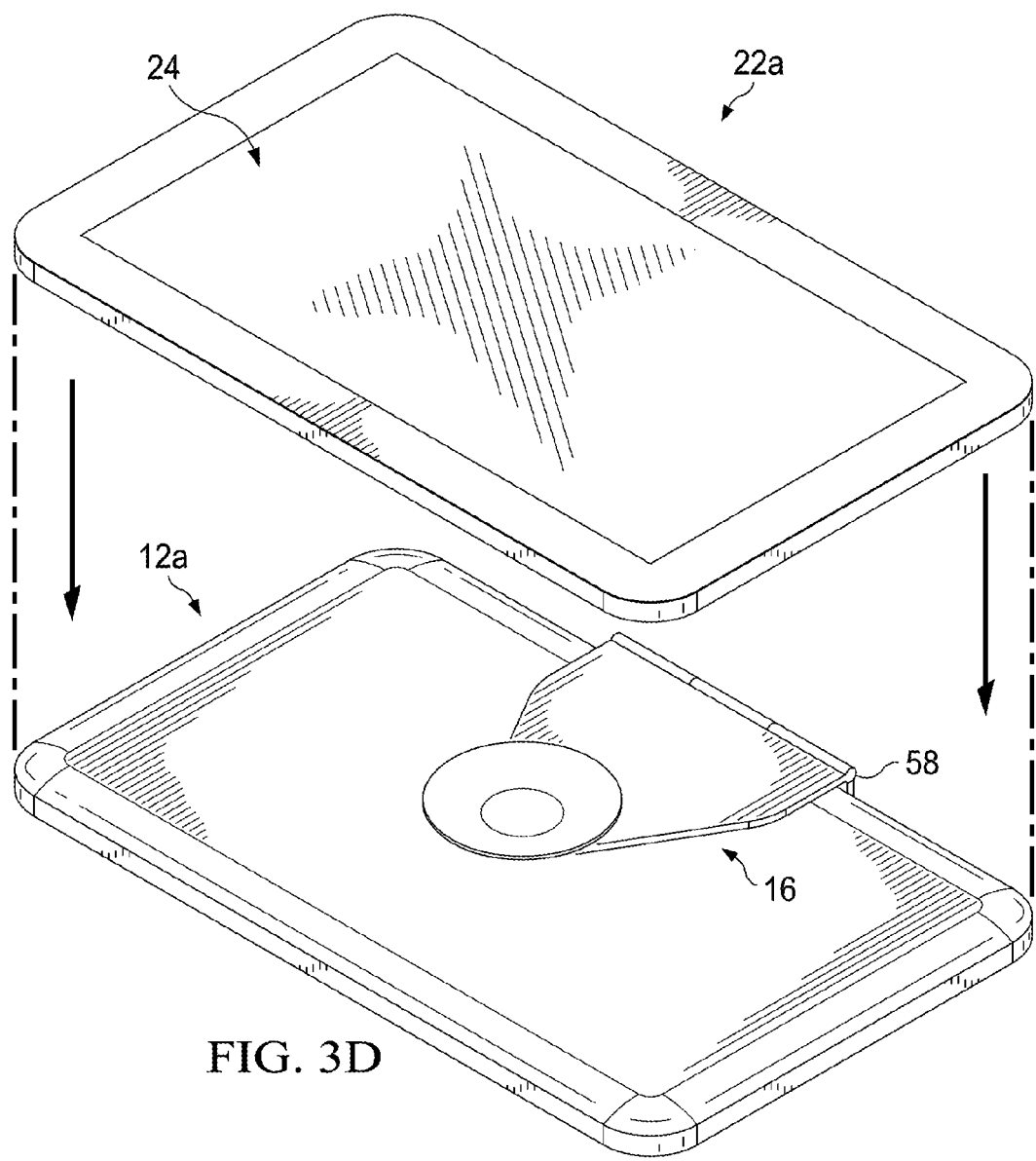
FIG. 3D is a simplified orthographic view illustrating an embodiment of an electronic device, in accordance with one embodiment of the present disclosure.

Turning to FIG. 3D, FIG. 3D is a simplified orthographic view illustrating a portion of electronic device 10a in accordance with one embodiment of the present disclosure. As illustrated in FIG. 3D, keyboard portion 12a has been flipped over from the position illustrated in FIG. 3C such that display portion 22a can be attached to display attachment 16. Turning to FIG. 3E, FIG. 3E is a simplified orthographic view illustrating a portion of electronic device 10a in accordance with one embodiment of the present disclosure. As illustrated in FIG. 3E, display portion 22a has been attached to display attachment 16 and electronic device 10a is in a tablet configuration.

Figure 4A:
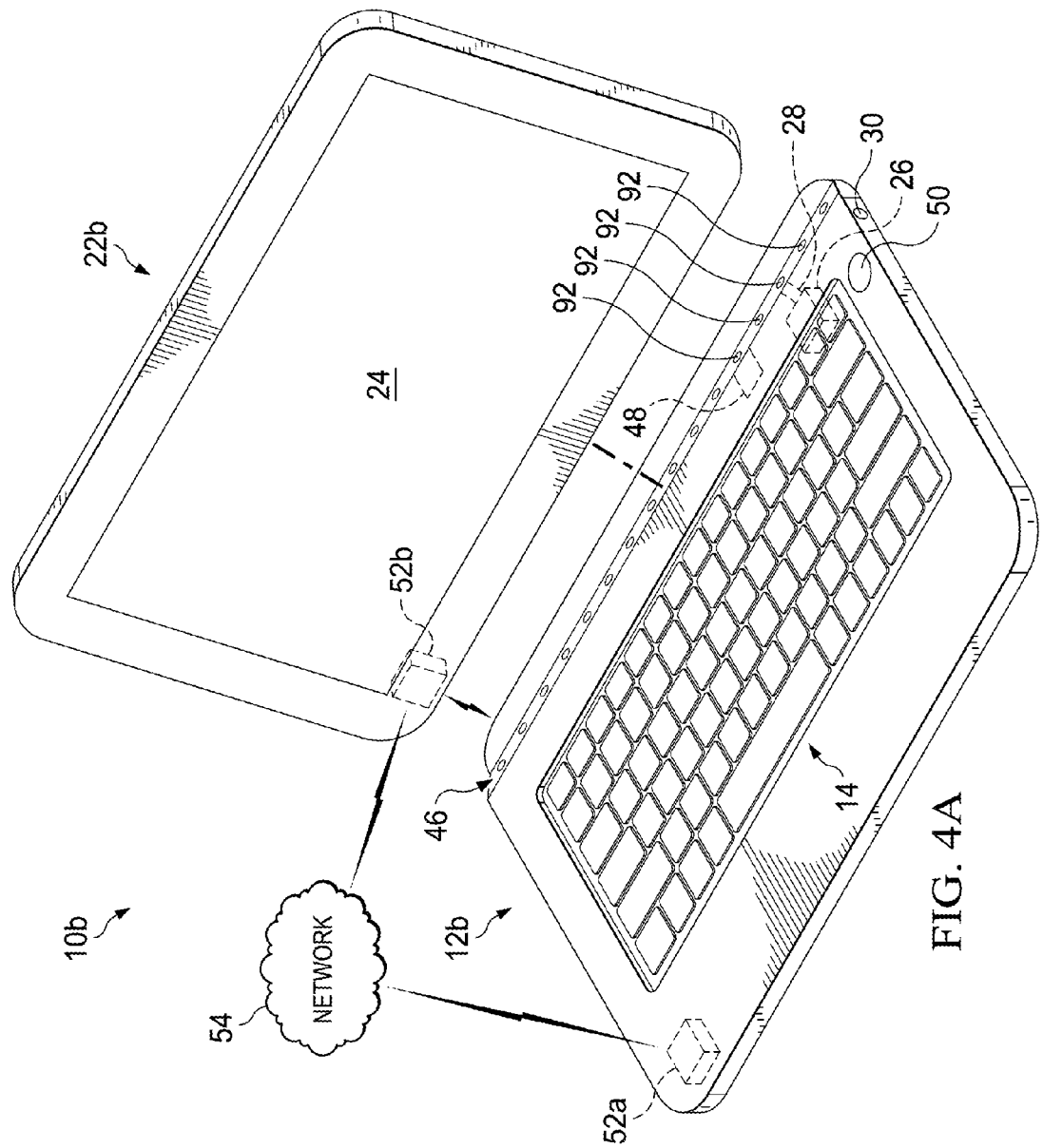
FIG. 4A is a simplified orthographic view illustrating an embodiment of an electronic device, in accordance with one embodiment of the present disclosure.

Turning to FIG. 4A, FIG. 4A is a simplified orthographic view illustrating an embodiment of an electronic device 10b in a detached configuration in accordance with one embodiment of the present disclosure. Electronic device 10b may include a keyboard portion 12b and a display portion 22b. Keyboard portion 12b may include keyboard 14, pump 26, release 30, a lateral display attachment 46, a pressure sensor 48, a lateral attachment activator 50, and a wireless module 52a. Display attachment 46 may include a plurality of lateral attachment mechanisms 92. Display portion 22b may include display 24 and a wireless module 52b. Wireless module 52a and 52b can be any wireless module (e.g., Wi-Fi module, Bluetooth module, any suitable 802 protocol, etc.) that allows keyboard portion 12b and display portion 22b to communicate with each other, a network 54, or other electronic devices.

Network 54 may be a series of points or nodes of interconnected communication paths for receiving and transmitting packets of information that propagate through network 54. Network 54 offers a communicative interface and may be any local area network (LAN), wireless local area network (WLAN), metropolitan area network (MAN), Intranet, Extranet, WAN, virtual private network (VPN), or any other appropriate architecture or system that facilitates communications in a network environment. Network 54 can comprise any number of hardware or software elements coupled to (and in communication with) each other through a communications medium.

Figure 4B:
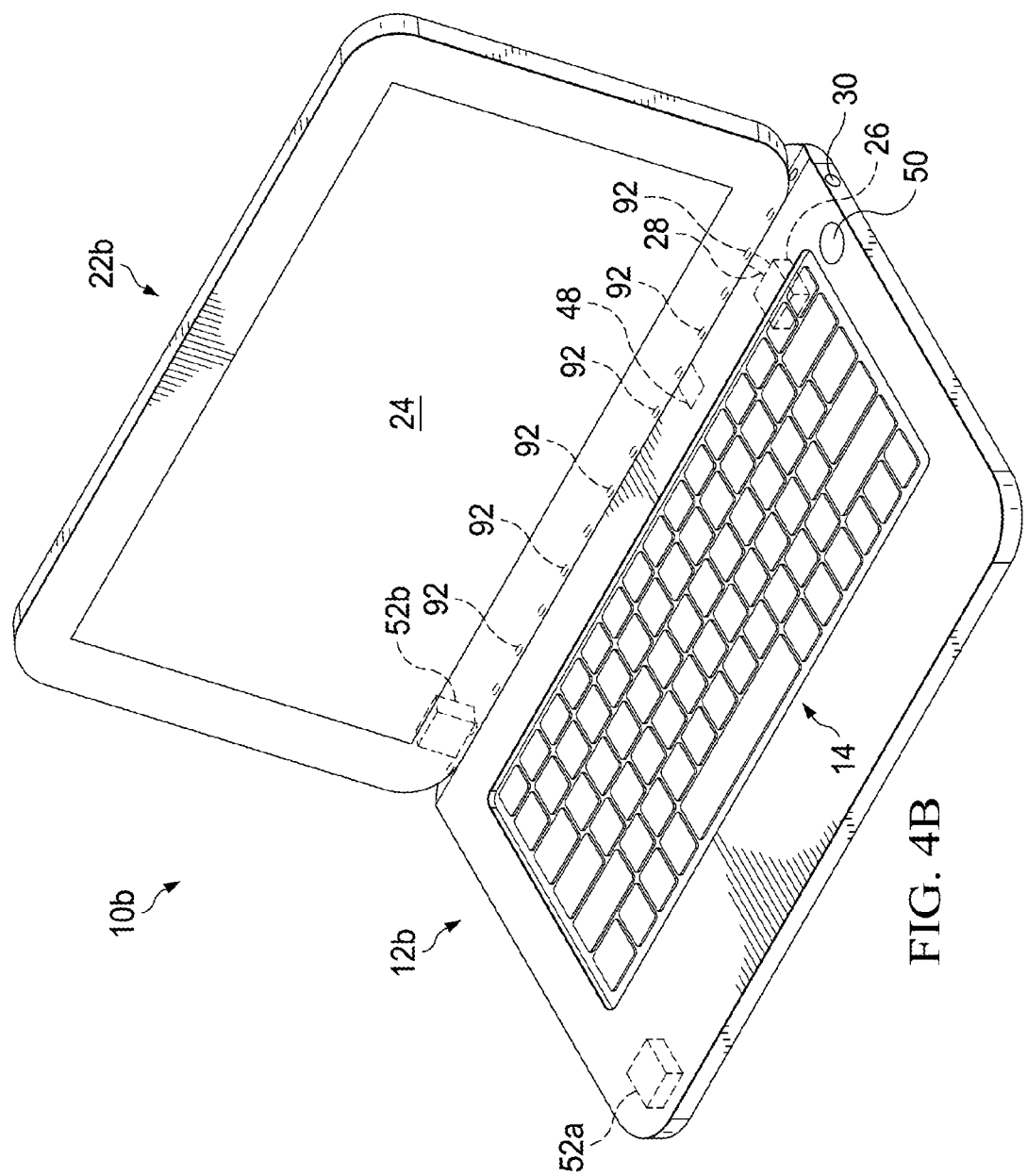
FIG. 4B is a simplified orthographic view illustrating an embodiment of an electronic device, in accordance with one embodiment of the present disclosure.

Turning to FIG. 4B, FIG. 4B is a simplified orthographic view illustrating an embodiment of electronic device 10b in an attached clamshell configuration in accordance with one embodiment of the present disclosure. As illustrated in FIG. 4B, lateral attachment activator 50 has activated pump 26 such that a pressure differential can be created by plurality of lateral attachment mechanisms 92 and display portion 22b can be secured to keyboard portion 12b. Pressure sensor 48 can monitor the pressure differential and if the pressure differential is below a threshold, pressure sensor 48 can activate pump 26 and increase the pressure differential in lateral attachment mechanisms 92. Release 30 can be activated to turn off or stop pump 26 such that display portion 22b can be released from keyboard portion 12b.

Figure 4C:
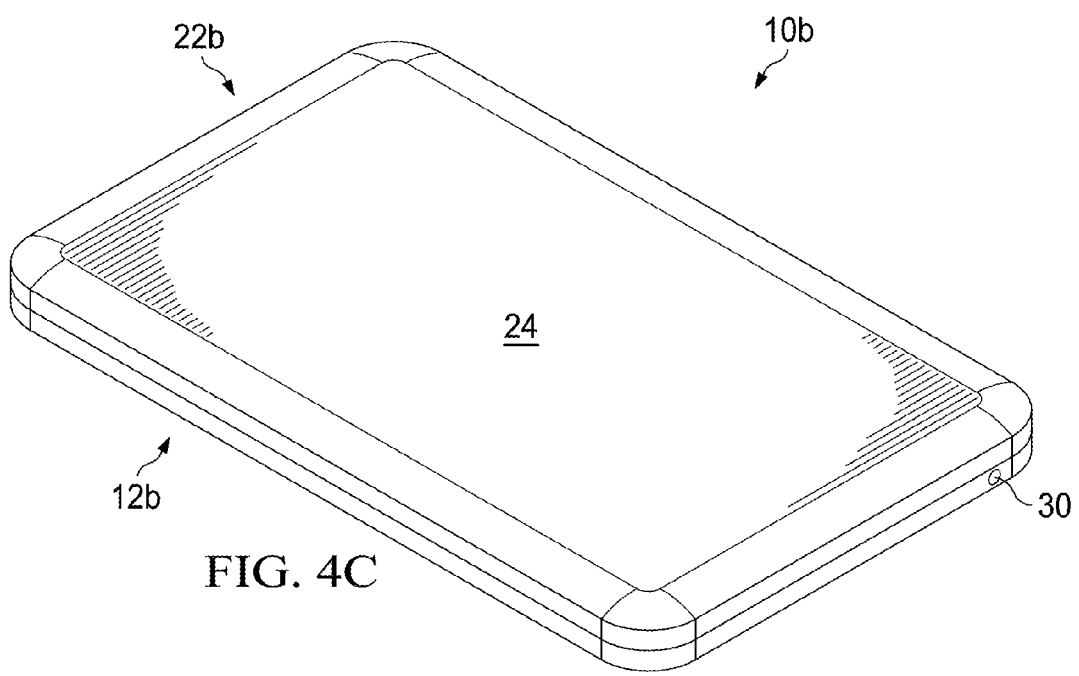
FIG. 4C is a simplified orthographic view illustrating an embodiment of an electronic device, in accordance with one embodiment of the present disclosure.

Turning to FIG. 4C, FIG. 4C is a simplified orthographic view illustrating an embodiment of electronic device 10b in an attached tablet configuration in accordance with one embodiment of the present disclosure. As illustrated in FIG. 4C, display portion 22b has been laid flat on keyboard portion 12b with display 24 facing away from keyboard 14. Before laying display portion 22b on keyboard portion 12b, lateral attachment activator 50 may have activated pump 26 such that a pressure differential can be created by plurality of lateral attachment mechanisms 92 and display portion 22b can be secured to keyboard portion 12b. Pressure sensor 48 can monitor the pressure differential and if the pressure differential is below a threshold, pressure sensor 48 can activate pump 26 and increase the pressure differential. Release 30 can be activated to turn off or stop pump 26 such that display portion 22b can be removed from keyboard portion 12b.

Figure 4D:
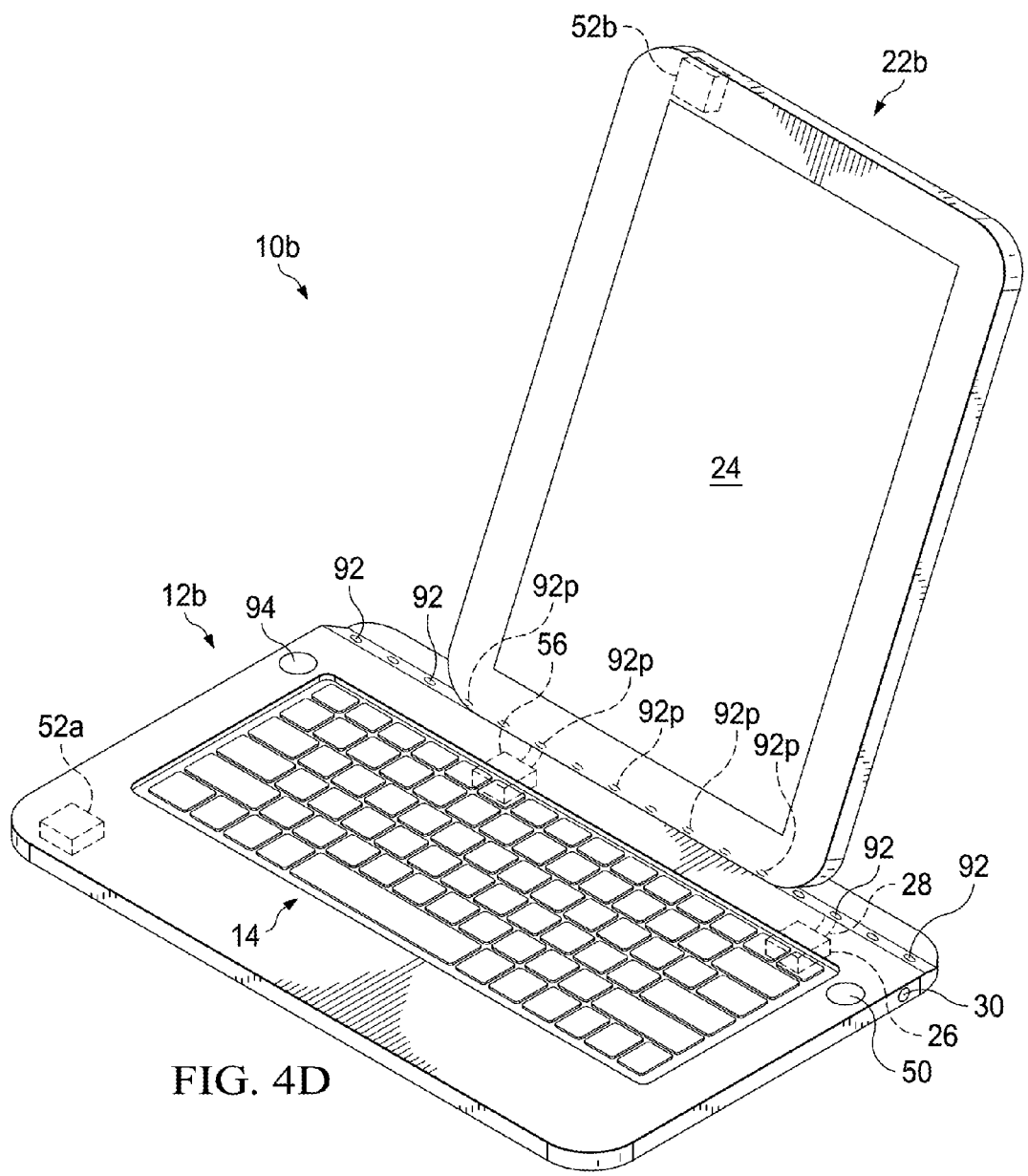
FIG. 4D is a simplified orthographic view illustrating an embodiment of an electronic device, in accordance with one embodiment of the present disclosure.

Turning to FIG. 4D, FIG. 4D is a simplified orthographic view illustrating an embodiment of electronic device 10b in an attached portrait clamshell configuration in accordance with one embodiment of the present disclosure. Keyboard portion 12b can include a portrait orientation pump 56, a plurality of portrait attachment mechanisms 92p, and a portrait lateral attachment activator 94. As illustrated in FIG. 4D, portrait lateral attachment activator 94 has activated portrait orientation pump 56 such that a pressure differential is created by plurality of portrait attachment mechanisms 92p and display portion 22b can be secured to keyboard portion 12b in a portrait configuration. Plurality of portrait attachment mechanisms 92p can be configured to function as plurality of lateral attachment mechanisms 92 when pump 26 is activated. Pressure sensor 48 (not shown) can monitor the pressure differential created by plurality of portrait attachment mechanisms 92p and if the pressure differential is below a threshold, pressure sensor 48 can activate portrait orientation pump 56 and increase the pressure differential. Release 30 can be activated to turn off or stop portrait orientation pump 56 such that display portion 22b can be removed from keyboard portion 12b.

Figure 4E:
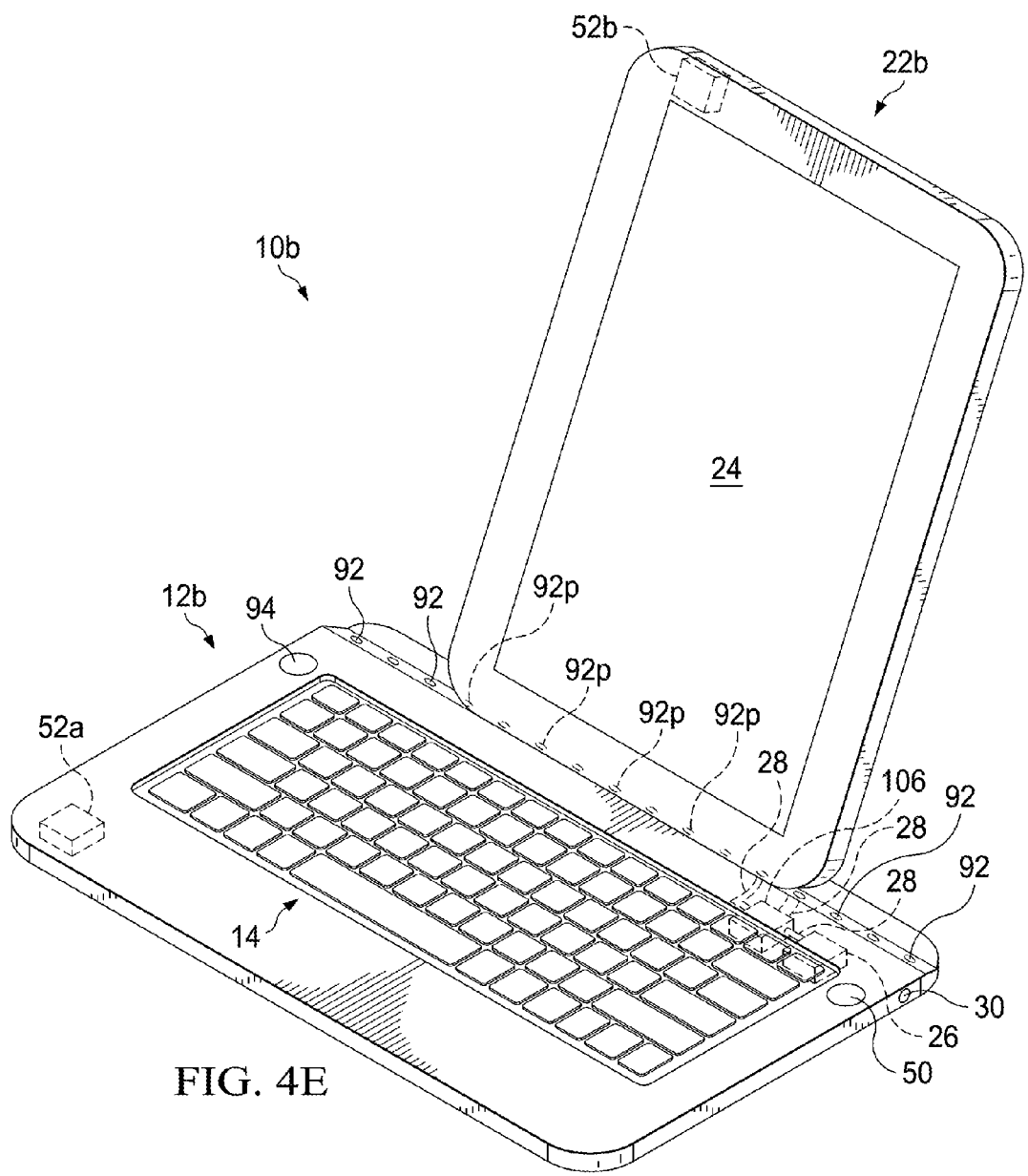
FIG. 4E is a simplified orthographic view illustrating an embodiment of an electronic device, in accordance with one embodiment of the present disclosure.

Turning to FIG. 4E, FIG. 4E is a simplified orthographic view illustrating an embodiment of electronic device 10b in an attached portrait clamshell configuration in accordance with one embodiment of the present disclosure. Keyboard portion 12b can include an orientation valve 106. Orientation valve 106 can be configured to direct the differential pressure created by pump 26 to plurality of lateral attachment mechanisms 92 or plurality of portrait attachment mechanisms 92p. For example, when lateral attachment activator 50 is activated, orientation valve 106 can direct the differential pressure created by pump 26 to plurality of lateral attachment mechanisms 92 and plurality of portrait attachment mechanisms 92p and allow display portion 22b to be secured in a lateral configuration (as illustrated in FIG. 4A). When portrait lateral attachment activator 94 is activated, orientation valve 106 can direct the differential pressure created by pump 26 to plurality of portrait attachment mechanisms 92p and allow the display portion 22b to be secured in a portrait configuration (as illustrated in FIG. 4E). In an embodiment, orientation valve 106 may be located in pump 26.

Figure 5A:
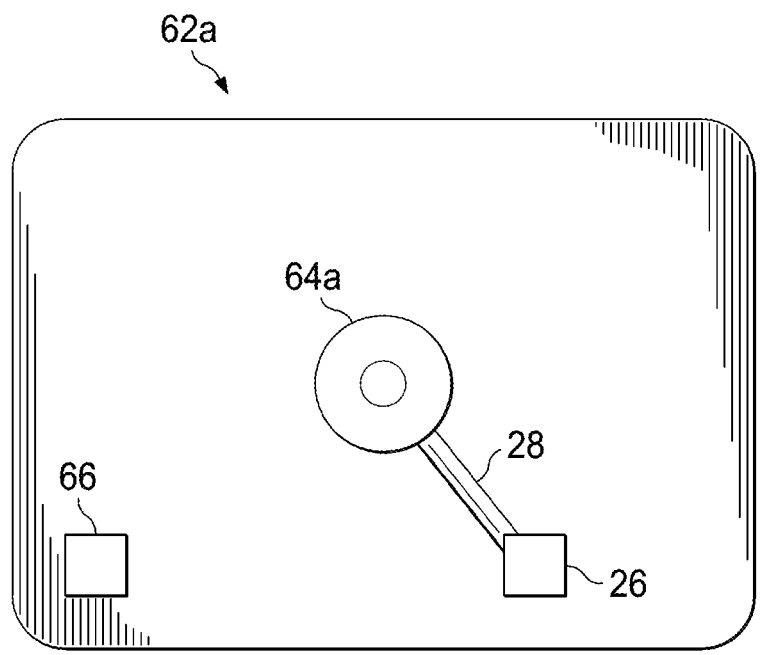
FIG. 5A is a simplified block diagram illustrating an embodiment of an electronic device, in accordance with one embodiment of the present disclosure.

Turning to FIG. 5A, FIG. 5A is a simplified orthographic view illustrating an embodiment of a tablet 62a in accordance with one embodiment of the present disclosure. Tablet 62a can include pump 26, pump tube 28, a tablet attachment 64a, and a proximity sensor 66. Proximity sensor can detect when tablet 62a is within close proximity of a surface or device and activate pump 26. In an embodiment, when pump 26 is activated, air can be drawn through pump tube 28 creating a pressure differential in tablet attachment 64a. The pressure differential can create a suction like force and may be used to attach tablet 62a to a surface or device. A pressure sensor (e.g., pressure sensor 48) may monitor the pressure differential and activate pump 26 if the pressure differential fall below a threshold.

Figure 5B:
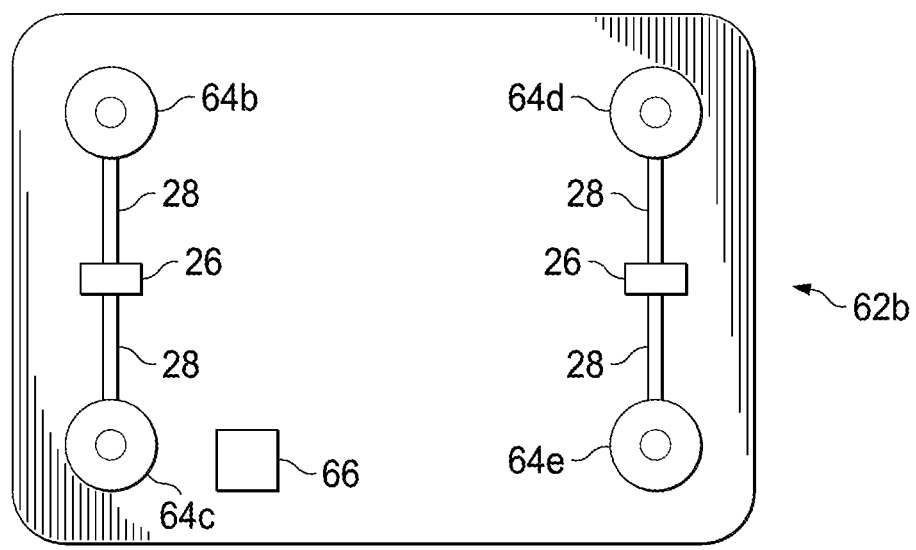
FIG. 5B is a simplified block diagram illustrating an embodiment of an electronic device, in accordance with one embodiment of the present disclosure.

Turning to FIG. 5B, FIG. 5B is a simplified orthographic view illustrating an embodiment of a tablet 62b in accordance with one embodiment of the present disclosure. Tablet 62b can include a plurality of pumps 26, pump tube 28, tablet attachments 64b-d, and proximity sensor 66. In an embodiment, each tablet attachments 64b-d may have their own pump 26. In another embodiment, one pump 26 may be connected to each tablet attachments 64b-d. The illustrated amount and placement of pumps and tablet attachments are for example purposes only as many different numbers and configurations of pumps and tablet attachments are possible. Proximity sensor 66 can detect when tablet 62a is within close proximity of a surface or device and activate one or more pumps 26. When one or more pumps 26 are activated, air can be drawn through pump tube 28 creating a pressure differential in each tablet attachment 6b-d. The pressure differential can create a suction like force and may be used to attach tablet 62a to a surface or device. A pressure sensor (e.g., pressure sensor 48) may monitor the pressure differential and activate one or more pumps 26 if the pressure differential fall below a threshold.

Figure 5C:
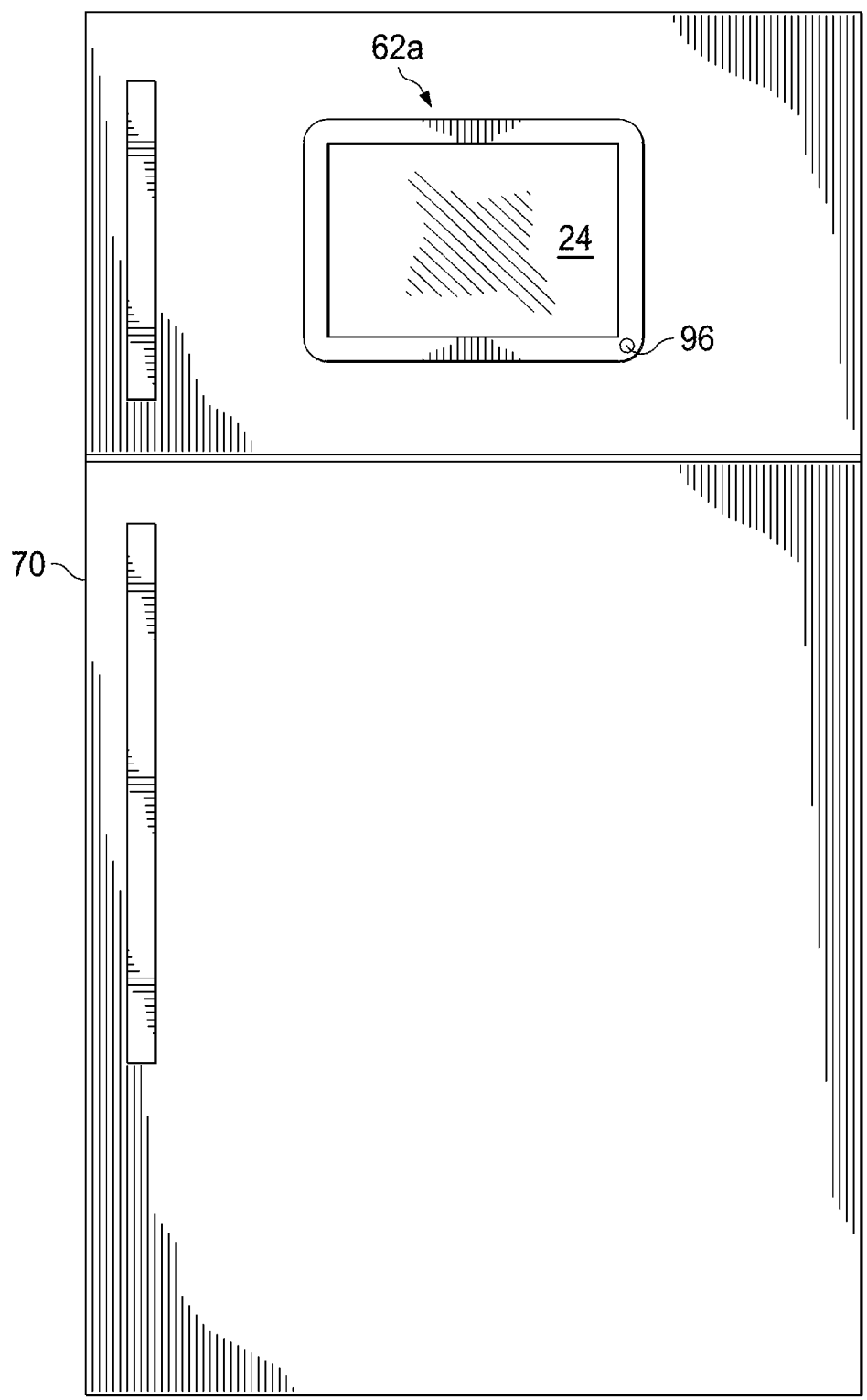
FIG. 5C is a simplified block diagram illustrating an embodiment of an electronic device, in accordance with one embodiment of the present disclosure.

Turning to FIG. 5C, FIG. 5C is a simplified block diagram illustrating an embodiment of tablet 62a attached to a surface or device 70 in accordance with one embodiment of the present disclosure. While a refrigerator is illustrated as an example of surface or device 70, almost any surface or device able to preserve a pressure differential may be used. Release 96 can be activated to turn off or stop plurality of pumps 26 such that tablet 62a can be released or removed from surface or device 70.

Figure 6A:
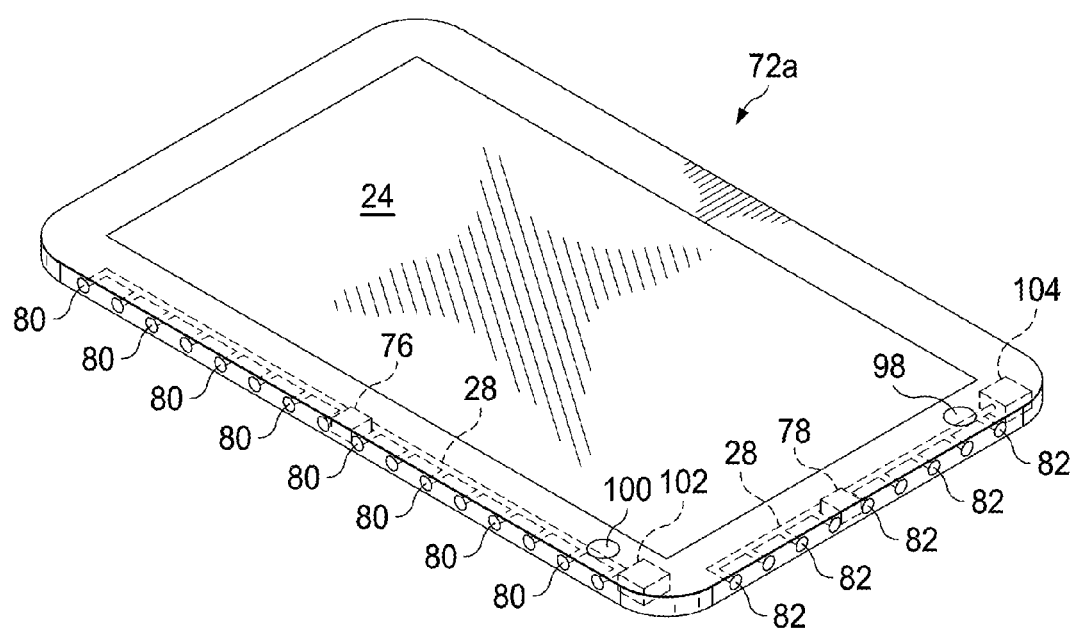
FIG. 6A is a simplified orthographic view illustrating an embodiment of an electronic device, in accordance with one embodiment of the present disclosure.

Turning to FIG. 6A, FIG. 6A is a simplified orthographic view illustrating an embodiment of a dual orientation display 72a in accordance with one embodiment of the present disclosure. Dual orientation display 72a can include display 24, pump tube 28, a landscape proximity sensor 76, a portrait proximity sensor 78, a plurality of landscape attachment mechanisms 80, a plurality of portrait attachment mechanisms 82, a portrait release 98, a landscape release 100, a landscape pump 102, and a portrait pump 104. Landscape pump 102 and portrait pump 104 may each be an ultra-sonic piezo pump or some other similar pump.

Figure 6B:
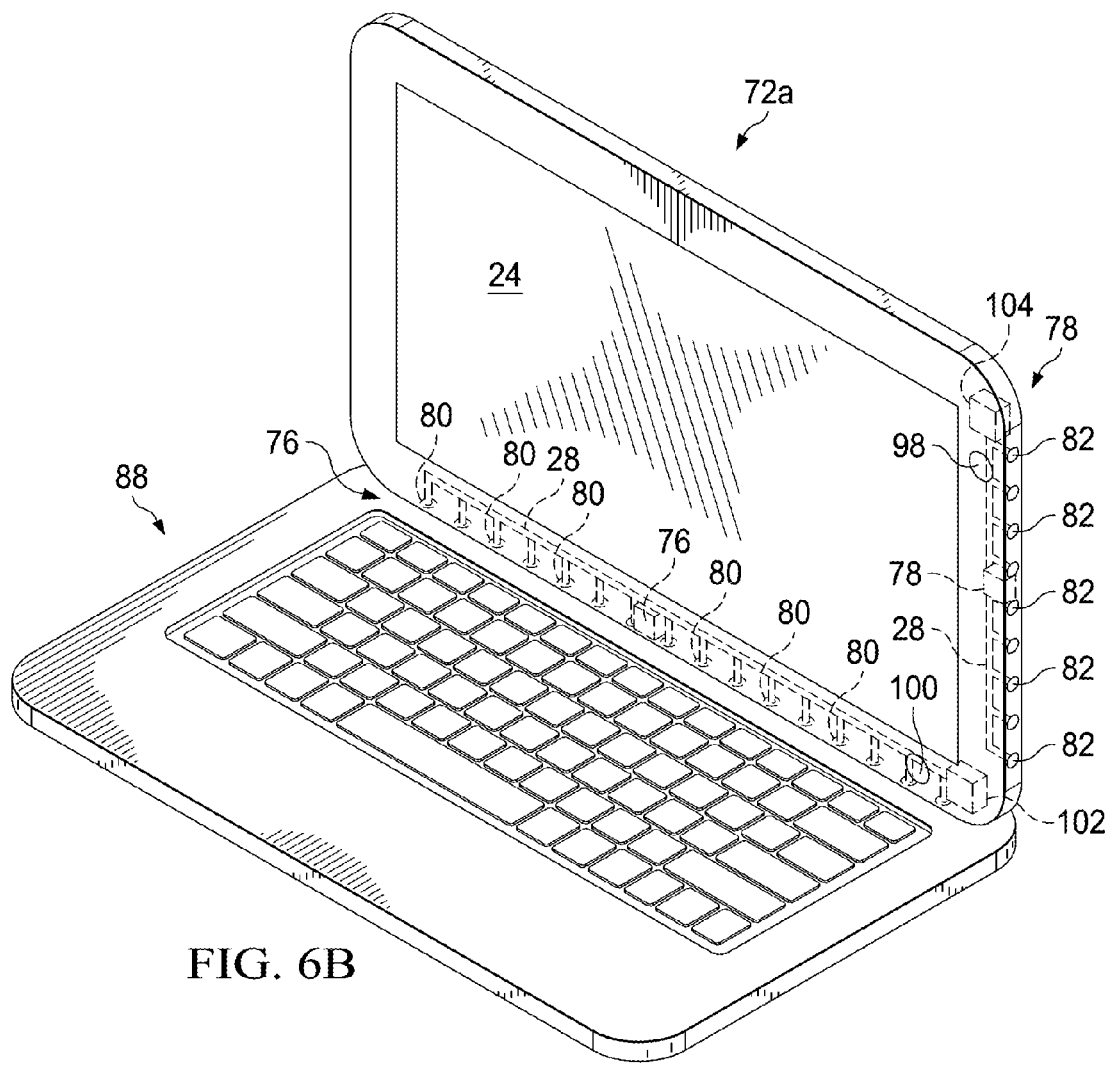
FIG. 6B is a simplified orthographic view illustrating an embodiment of an electronic device, in accordance with one embodiment of the present disclosure.

Turning to FIG. 6B, FIG. 6B is a simplified orthographic view illustrating an embodiment of dual orientation display 72a in accordance with one embodiment of the present disclosure. As illustrated in FIG. 6B, dual orientation display 72a has been attached to a base 88 using plurality of landscape attachment mechanisms 80. In an embodiment, when dual orientation display 72a is brought near base 88, landscape proximity sensor 76 can activate landscape pump 102 and create a pressure differential in plurality of landscape attachment mechanisms 80. Dual orientation display 72a can be released from base 88 by activating landscape release 100 to stop or turn off landscape pump 102 and release the pressure differential in plurality of landscape attachment mechanisms 80.

Figure 6C:
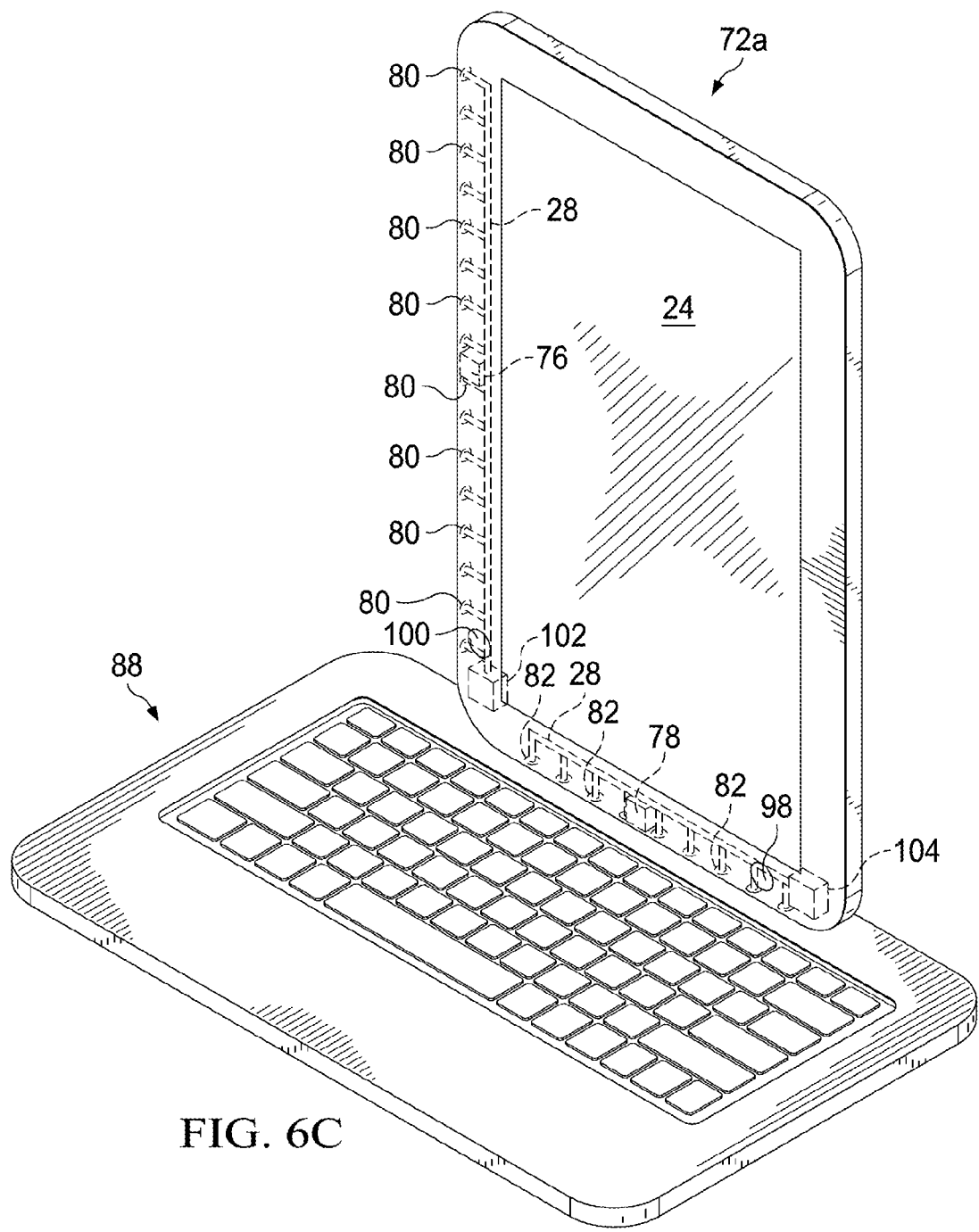
FIG. 6C is a simplified orthographic view illustrating an embodiment of an electronic device, in accordance with one embodiment of the present disclosure.

Turning to FIG. 6C, FIG. 6C is a simplified orthographic view illustrating an embodiment of dual orientation display 72a in accordance with one embodiment of the present disclosure. As illustrated in FIG. 6C, dual orientation display 72a has been attached to base 88 using plurality of portrait attachment mechanisms 82. In an embodiment, when dual orientation display 72a is brought near base 88, portrait proximity sensor 78 can activate portrait pump 104 and create a pressure differential in plurality of portrait attachment mechanisms 82. Dual orientation display 72a can be released from base 88 by activating portrait release 98 to stop or turn off portrait pump 104 and release the pressure differential in plurality of portrait attachment mechanisms 82.

Figure 6D:
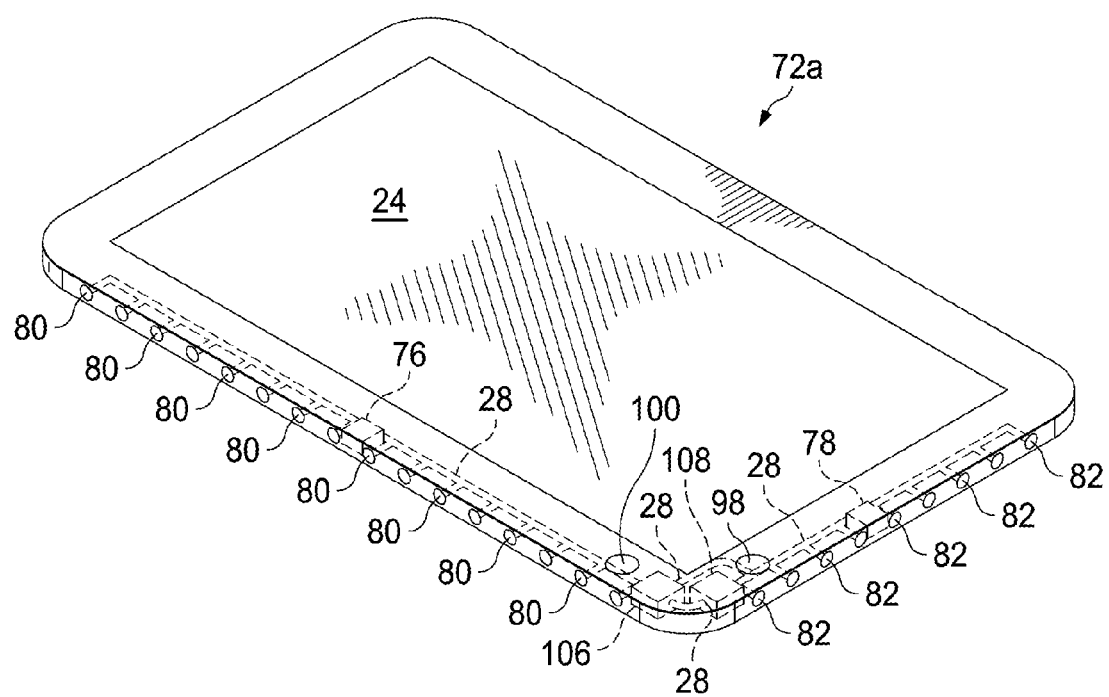
FIG. 6D is a simplified orthographic view illustrating an embodiment of an electronic device, in accordance with one embodiment of the present disclosure.

Turning to FIG. 6D, FIG. 6D is a simplified orthographic view illustrating an embodiment of dual orientation display 72a in accordance with one embodiment of the present disclosure. Dual orientation display 72a can include orientation valve 106 and display pump 108. Orientation valve 106 can be configured to divert the differential pressure created by display pump 108 to plurality of landscape attachment mechanisms 80 or plurality of portrait attachment mechanisms 82. For example, when landscape proximity sensor 76 is activated, orientation valve 106 can divert the differential pressure created by display pump 108 to plurality of landscape attachment mechanisms 80 and allow dual orientation display 72a to be secured to base 88 in a lateral configuration (as illustrated in FIG. 6B). When portrait proximity sensor 78 is activated, orientation valve 106 can divert the differential pressure created by display pump 108 to plurality of portrait attachment mechanisms 82 and allow the display portion 22b to be secured in a portrait configuration (as illustrated in FIG. 6C). In an embodiment, orientation valve 106 may be located in display pump 108.

Figure 7A:
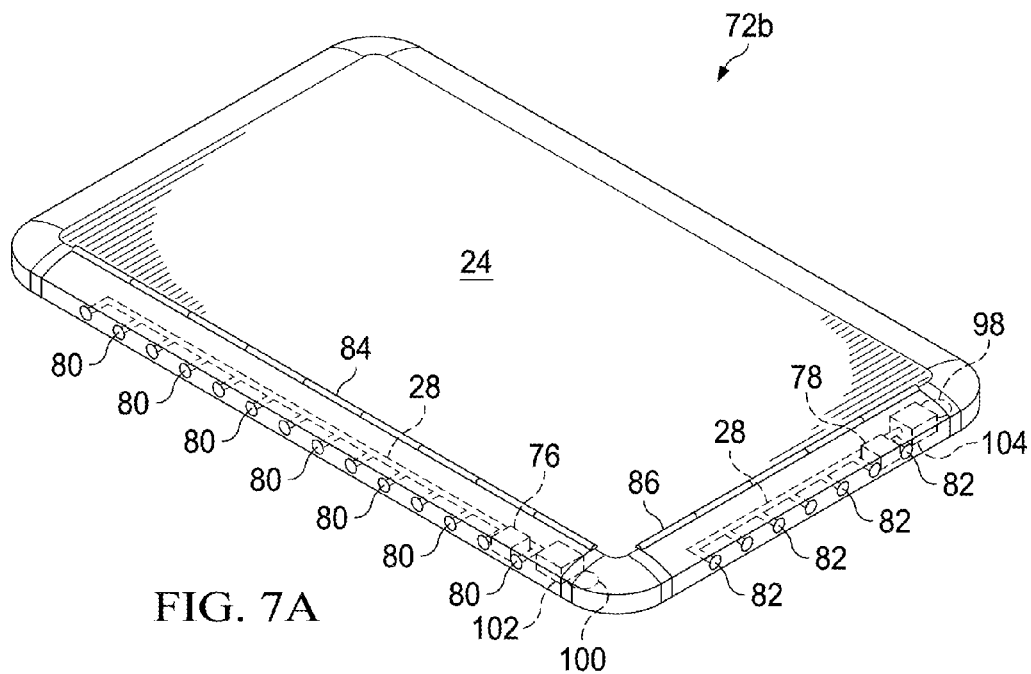
FIG. 7A is a simplified orthographic view illustrating an embodiment of an electronic device, in accordance with one embodiment of the present disclosure.

Turning to FIG. 7A, FIG. 7A is a simplified orthographic view illustrating an embodiment of dual orientation display 72b in accordance with one embodiment of the present disclosure. Dual orientation display 72b can include a landscape hinge 84 and a portrait hinge 86. Landscape hinge 84 and portrait hinge 86 may be rotated to allow for a desired display angle of display 24 when dual orientation display 72b is attached to a surface or device. For example, landscape hinge 84 and portrait hinge 86 may be rotated at least about ninety degrees.

Figure 7B:
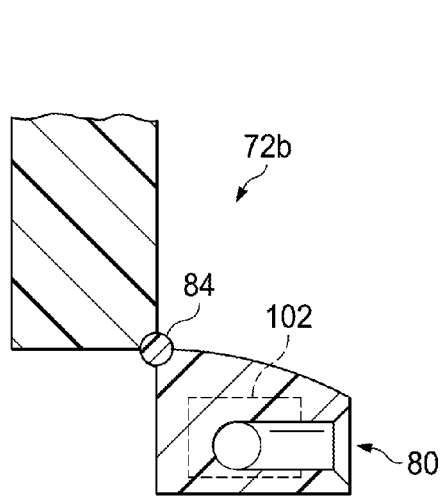
FIG. 7B is a simplified block diagram illustrating an embodiment of a portion of an electronic device, in accordance with one embodiment of the present disclosure.

Turning to FIG. 7B, FIG. 7B is a simplified side view illustrating an embodiment of dual orientation display 72b in accordance with one embodiment of the present disclosure. As illustrated in FIG. 7B, landscape attachment mechanism 80 has been rotated about ninety degrees on landscape hinge 84. In this configuration, dual orientation display 72b can be attached to a surface or device such that display 24 is relatively parallel to the surface or device.

Figure 7D:
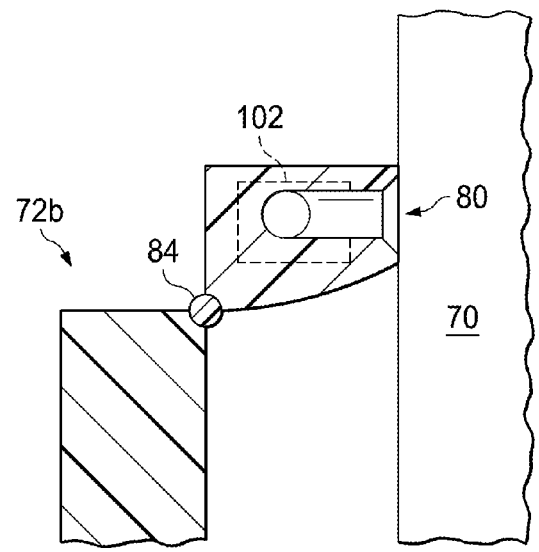
FIG. 7D is a simplified block diagram illustrating an embodiment of a portion of an electronic device, in accordance with one embodiment of the present disclosure.
Figure 7C:
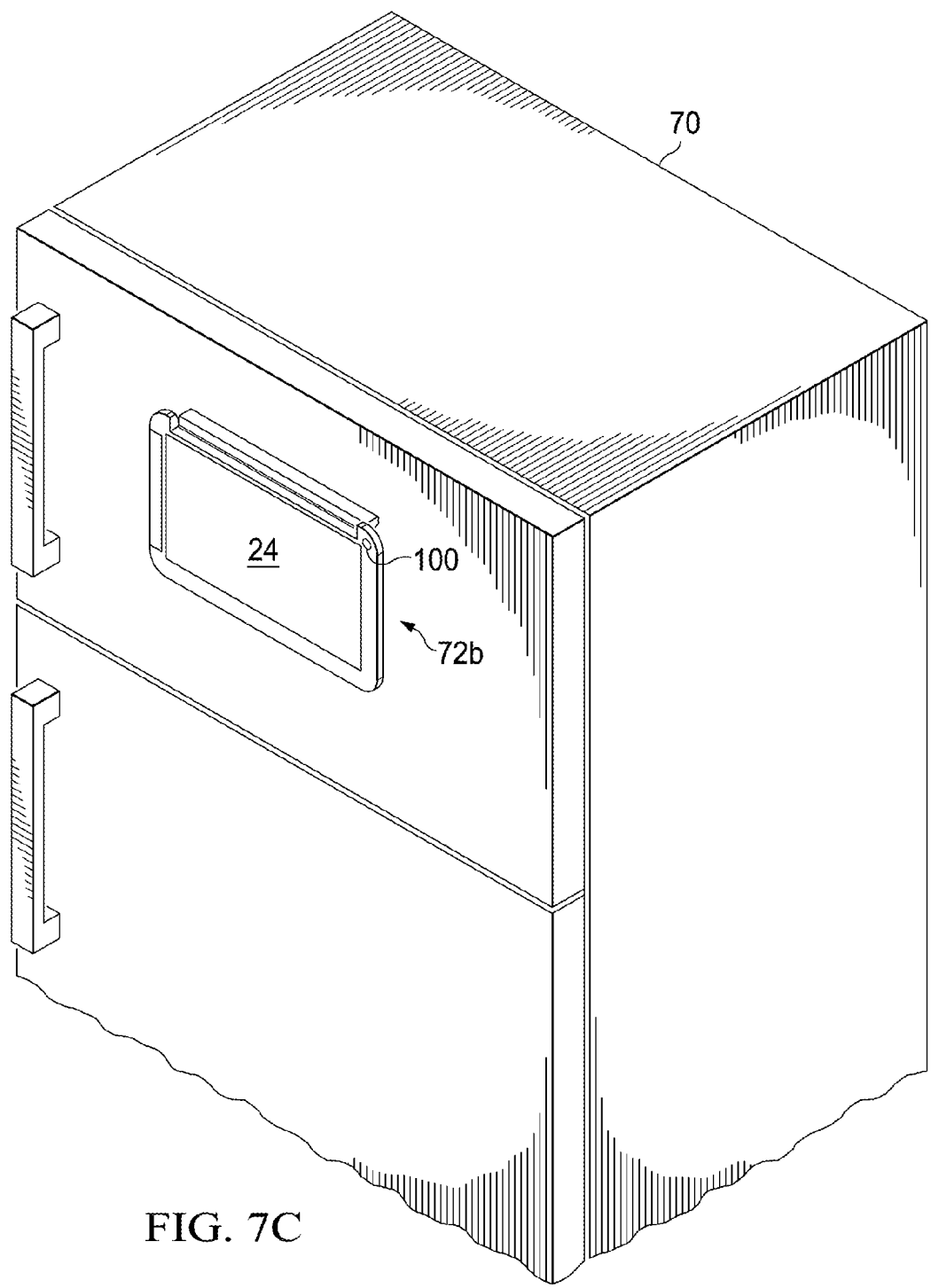
FIG. 7C is a simplified orthographic view illustrating an embodiment of an electronic device, in accordance with one embodiment of the present disclosure.

Turning to FIG. 7C, FIG. 7C is a simplified block diagram illustrating an embodiment of dual orientation display 72b attached to a surface or device 70 in accordance with one embodiment of the present disclosure. Landscape release 10 can be activated to turn off or stop landscape pump 102 such that the pressure differential can be removed and dual orientation display 72b can be released or removed from surface or device 70. Turning to FIG. 7D, FIG. 7D is a simplified side view illustrating an embodiment of dual orientation display 72b attached to surface or device 70 in accordance with one embodiment of the present disclosure.

Note that the embodiments of FIGS. 1A-7D are simply reflective of one of the many possible design choices for electronic devices 10a and b, tablets 62a and b, and dual orientation displays 72a and b. In other cases, the location, shape, and size of attachment mechanism 18, pump 26, portrait orientation pump 56, tablet mechanism 64a-e, plurality of landscape attachment mechanisms 80, plurality of portrait mechanisms 82, landscape pump 102, and portrait pump 104 may be varied considerably. For example, in certain cases, attachment mechanism 18, tablet mechanism 64a-e, plurality of landscape attachment mechanisms 80, or plurality of portrait mechanisms 82 may occupy only a portion of a device's framework. Consider a case in which a design of attachment mechanism 18 only inhibits a top center portion of a device's framework. In other cases, a design could be provided where attachment mechanism 18 inhibits a majority of the top portion of a device's framework.

Figure 8:
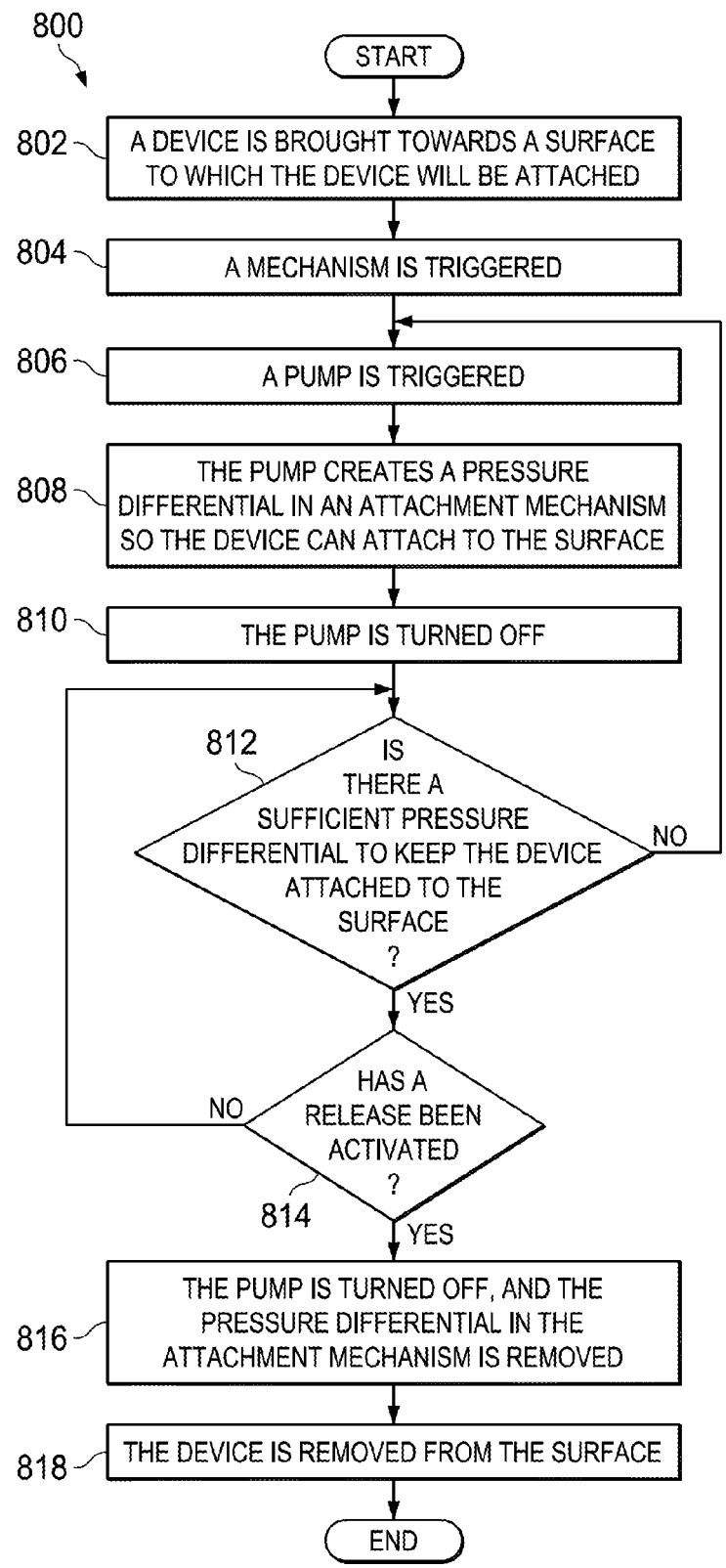
FIG. 8 illustrates, for at least one embodiment, a flow diagram in accordance with at least one embodiment of the present disclosure.

FIG. 8 is a simplified flowchart 800 illustrating example activities in accordance with at least one example embodiment of the present disclosure. At 802, a device is brought towards a surface that the device will be attached to. At 804, a mechanism is triggered. For example, an attachment activator or proximity sensor may activate or trigger a mechanism. At 806, a pump is triggered. The pump can be triggered in response to the mechanism being triggered. At 808, the pump creates a pressure differential in an attachment mechanism so the device can attach to the surface. At 810, the pump turns off. At 812, the system determines if there is a sufficient pressure differential to keep the device attached to the surface. If there is not a sufficient pressure differential to keep the device attached to the surface, then the pump is triggered, as in 806. If there is a sufficient pressure differential to keep the device attached to the surface, then the system determines if a release has been activated, as in 814. If the release has not been activated, then the system determines if there is a sufficient pressure differential to keep the device attached to the surface, as in 812. If the release has been activated, then the pump is turned off and the pressure differential in the attachment mechanism is removed, as in 816. At 818, the device is removed from the surface.

Figure 9:
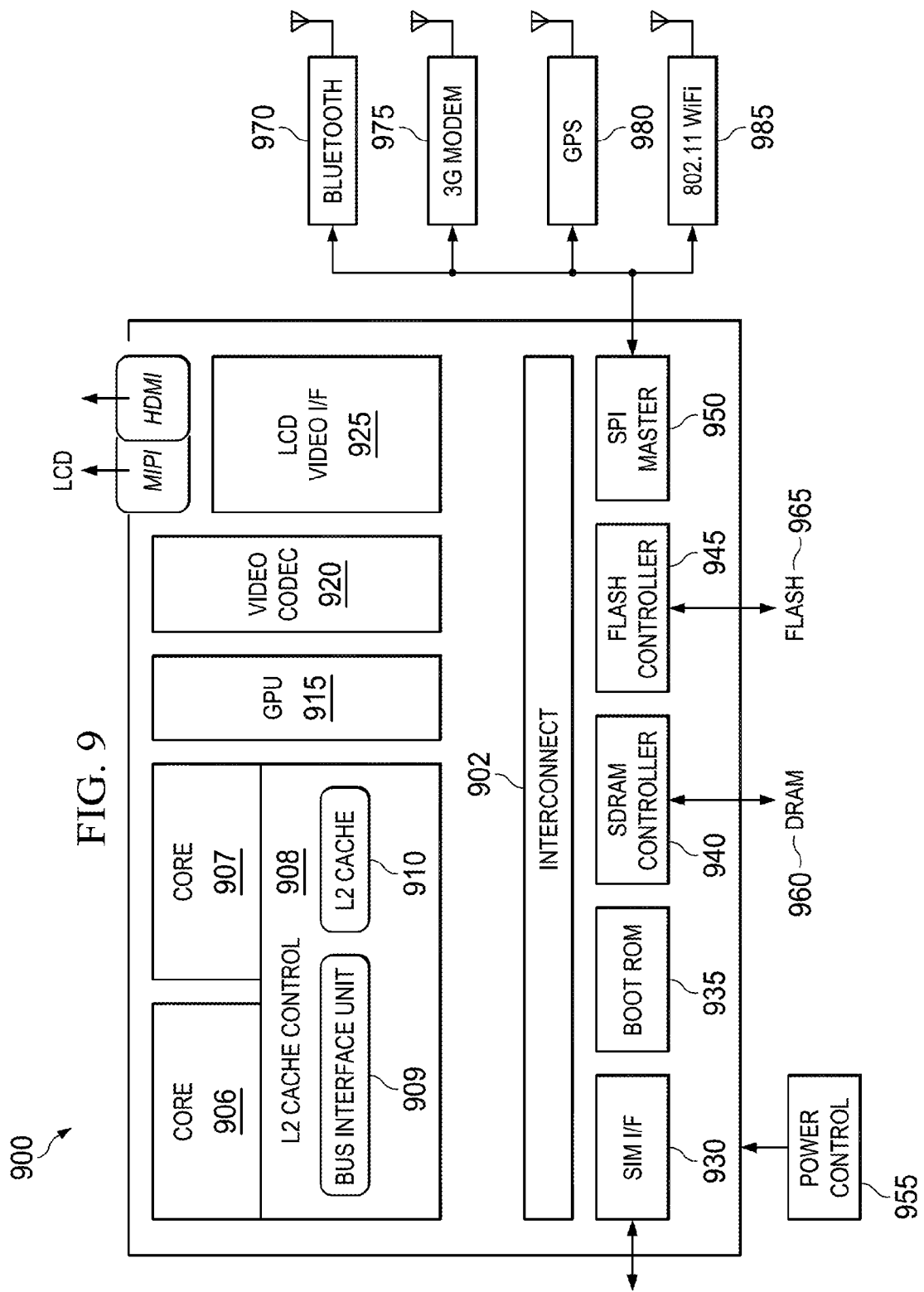
FIG. 9 is a simplified block diagram associated with an example ARM ecosystem system on chip (SOC) of the present disclosure.

Turning to FIG. 9, FIG. 9 is a simplified block diagram associated with an example ARM ecosystem SOC 900 of the present disclosure. At least one example implementation of the present disclosure can include the differential pressure features discussed herein and an ARM component. For example, the example of FIG. 9 can be associated with any ARM core (e.g., A-9, A-15, etc.). Further, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 9, ARM ecosystem SOC 900 may include multiple cores 906-907, an L2 cache control 908, a bus interface unit 909, an L2 cache 910, a graphics processing unit (GPU) 915, an interconnect 902, a video codec 920, and a liquid crystal display (LCD) I/F 925, which may be associated with mobile industry processor interface (MIPI)/high-definition multimedia interface (HDMI) links that couple to an LCD.

ARM ecosystem SOC 900 may also include a subscriber identity module (SIM) I/F 930, a boot read-only memory (ROM) 935, a synchronous dynamic random access memory (SDRAM) controller 940, a flash controller 945, a serial peripheral interface (SPI) master 950, a suitable power control 955, a dynamic RAM (DRAM) 960, and flash 965. In addition, one or more example embodiment include one or more communication capabilities, interfaces, and features such as instances of Bluetooth™ 970, a 3G modem 975, a global positioning system (GPS) 980, and an 802.11 WiFi 985.

In operation, the example of FIG. 9 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 10:
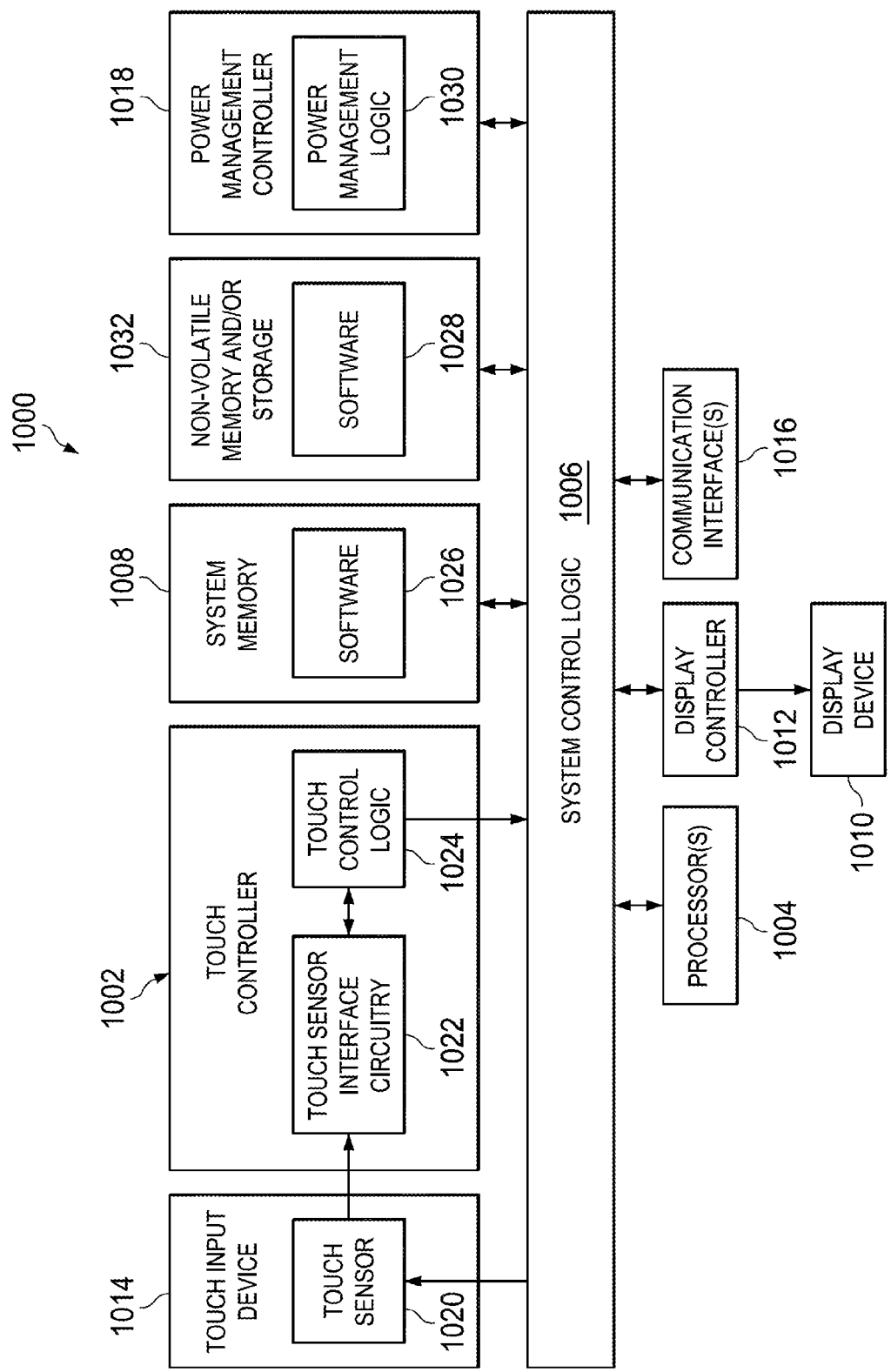
FIG. 10 is a simplified block diagram illustrating example logic that may be used to execute activities associated with the present disclosure.

Turning to FIG. 10, FIG. 10 is a simplified block diagram illustrating potential electronics and logic that may be associated with electronic devices 10a and b, tablets 62a and b, and dual orientation displays 72a and b discussed herein. In at least one example embodiment, system 1000 can include a touch controller 1002, one or more processors 1004, system control logic 1006 coupled to at least one of processor(s) 1004, system memory 1008 coupled to system control logic 1006, non-volatile memory and/or storage device(s) 1032 coupled to system control logic 1006, display controller 1012 coupled to system control logic 1006, display controller 1012 coupled to a display device 1010, power management controller 1018 coupled to system control logic 1006, and/or communication interfaces 1016 coupled to system control logic 1006.

Hence, the basic building blocks of any computer system (e.g., processor, memory, I/O, display, etc.) can be used in conjunction with the teachings of the present disclosure. Certain components could be discrete or integrated into a System on Chip (SoC). Some general system implementations can include certain types of form factors in which system 1000 is part of a more generalized enclosure. In alternate implementations, instead of notebook device/laptops, etc., certain alternate embodiments deal with mobile phones, tablet devices, etc.

System control logic 1006, in at least one embodiment, can include any suitable interface controllers to provide for any suitable interface to at least one processor 1004 and/or to any suitable device or component in communication with system control logic 1006. System control logic 1006, in at least one embodiment, can include one or more memory controllers to provide an interface to system memory 1008. System memory 1008 may be used to load and store data and/or instructions, for example, for system 1000. System memory 1008, in at least one embodiment, can include any suitable volatile memory, such as suitable dynamic random access memory (DRAM) for example. System control logic 1006, in at least one embodiment, can include one or more I/O controllers to provide an interface to display device 1010, touch controller 1002, and non-volatile memory and/or storage device(s) 1032.

Non-volatile memory and/or storage device(s) 1032 may be used to store data and/or instructions, for example within software 1028. Non-volatile memory and/or storage device(s) 1032 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 1018 may include power management logic 1030 configured to control various power management and/or power saving functions. In at least one example embodiment, power management controller 1018 is configured to reduce the power consumption of components or devices of system 1000 that may either be operated at reduced power or turned off when the electronic device is in a closed configuration. For example, in at least one embodiment, when the electronic device is in a closed configuration, power management controller 1018 performs one or more of the following: power down the unused portion of the display and/or any backlight associated therewith; allow one or more of processor(s) 1004 to go to a lower power state if less computing power is required in the closed configuration; and shutdown any devices and/or components that are unused when an electronic device is in the closed configuration.

Communications interface(s) 1016 may provide an interface for system 1000 to communicate over one or more networks and/or with any other suitable device. Communications interface(s) 1016 may include any suitable hardware and/or firmware. Communications interface(s) 1016, in at least one example embodiment, may include, for example, a network adapter, a wireless network adapter, a telephone modem, and/or a wireless modem. System control logic 1006, in at least one embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one embodiment, at least one processor 1004 may be packaged together with logic for one or more controllers of system control logic 1006. In at least one embodiment, at least one processor 1004 may be packaged together with logic for one or more controllers of system control logic 1006 to form a System in Package (SiP). In at least one embodiment, at least one processor 1004 may be integrated on the same die with logic for one or more controllers of system control logic 1006. For at least one embodiment, at least one processor 1004 may be integrated on the same die with logic for one or more controllers of system control logic 1006 to form a System on Chip (SoC).

For touch control, touch controller 1002 may include touch sensor interface circuitry 1022 and touch control logic 1024. Touch sensor interface circuitry 1022 may be coupled to detect, using a touch sensor 1020, touch input over a first touch surface layer and a second touch surface layer of a display (i.e., display device 1010). Touch sensor interface circuitry 1022 may include any suitable circuitry that may depend, for example, at least in part on the touch-sensitive technology used for a touch input device 1014. Touch sensor interface circuitry 1022, in one embodiment, may support any suitable multi-touch technology. Touch sensor interface circuitry 1022, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 1024 may be coupled to help control touch sensor interface circuitry 1022 in any suitable manner to detect touch input over a first touch surface layer and a second touch surface layer. Touch control logic 1024 for at least one example embodiment may also be coupled to output in any suitable manner digital touch input data corresponding to touch input detected by touch sensor interface circuitry 1022. Touch control logic 1024 may be implemented using any suitable logic, including any suitable hardware, firmware, and/or software logic (e.g., non-transitory tangible media), that may depend, for example, at least in part on the circuitry used for touch sensor interface circuitry 1022. Touch control logic 1024 for at least one embodiment may support any suitable multi-touch technology.

Touch control logic 1024 may be coupled to output digital touch input data to system control logic 1006 and/or at least one processor 1004 for processing. At least one processor 1004 for at least one embodiment may execute any suitable software to process digital touch input data output from touch control logic 1024. Suitable software may include, for example, any suitable driver software and/or any suitable application software. As illustrated in FIG. 10, system memory 1008 may store suitable software 1026 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

Example Embodiment Implementations

One particular example implementation of an electronic device may include activities associated with a differential pressure attachment for an electronic device. The differential pressure attachment allows for a convertible or hybrid laptop hinge that may not sacrifice usability, performance, or cost, and may not have significant industrial design implications. The differential pressure attachment can be configured to activate pump and create a pressure differential in an attachment mechanism such that a display portion can be attached to a keyboard portion. A pressure sensor in the attachment mechanism can activate the pump to increase the pressure differential in the attachment mechanism when the pressure differential is below a threshold. In another example, an attachment mechanism is located on a display portion and a pump located in the display portion can create a pressure differential in the attachment mechanism such that the display portion can be attached to a surface. The surface may be a device such as a keyboard portion, a vertical wall, or some other surface. The display portion can include a touch display. In another example implementation, a system is provided that includes a means for activating a pump, wherein the pump creates a pressure differential in an attachment mechanism and means for using the pressure differential in the attachment mechanism such that a display portion can be attached to a surface.

Other Notes and Examples

Example A1 is an electronic device that includes a keyboard that includes a keyboard portion, an attachment mechanism, and a pump located in the keyboard portion that creates a pressure differential in the attachment mechanism such that a display portion can be attached to the keyboard portion.

In Example A2, the subject matter of Example A1 may optionally include where the attachment mechanism is located on a display support that connects to a hinge on the keyboard portion.

In Example A3, the subject matter of any of the preceding 'A' Examples can optionally include a display attachment area on the display portion, where the display attachment area can accommodate the attachment mechanism.

In Example A4, the subject matter of any of the preceding 'A' Examples can optionally include a sealing member around the display attachment area.

In Example A5, the subject matter of any of the preceding 'A' Examples can optionally include where the attachment mechanism is located on the keyboard portion and allows the display portion to be attached in a landscape configuration or in a portrait configuration.

In Example A6, the subject matter of any of the preceding 'A' Examples can optionally include a hinge that connects the attachment mechanism to the keyboard portion, wherein the hinge can rotate around the keyboard portion.

In Example A7, the subject matter of any of the preceding 'A' Examples can optionally include a pressure sensor in the attachment mechanism. When the pressure differential is below a threshold, the pressure sensor can activate the pump to increase the pressure differential in the attachment mechanism.

Example AA1 can include an electronic device that includes a display portion, an attachment mechanism located on the display portion, and a pump located in the display portion that creates a pressure differential in the attachment mechanism such that the display portion can be attached to a surface.

In Example AA2, the subject matter of any of the preceding 'AA' Examples can optionally include where the surface is an electronic device.

In Example AA3, the subject matter of any of the preceding 'AA' Examples can optionally include a plurality of attachment mechanisms located on the display portion.

In Example AA4, the subject matter of any of the preceding 'AA' Examples can optionally include a plurality of pumps located in the display portion, where each pump can create the pressure differential in at least one of the plurality of attachment mechanisms.

In Example AA5, the subject matter of any of the preceding 'AA' Examples can optionally include an orientation valve, where the orientation valve can direct the pressure differential created by a pump to at least one of the plurality of attachment mechanisms.

In Example AA6, the subject matter of any of the preceding 'AA' Examples can optionally include a second attachment mechanism, where the second attachment mechanism allows the display portion to be attached to the surface in a landscape configuration and the attachment mechanism allows the display portion to be attached to the surface in a portrait configuration.

In Example AA7, the subject matter of any of the preceding 'AA' Examples can optionally include a hinge, where the hinge includes the attachment mechanism and the hinge can rotate at least ninety degrees.

In Example AA8, the subject matter of any of the preceding 'AA' Examples can optionally include a release to release the display mechanism from the surface.

Example M1 is a method that includes activating a pump, wherein the pump creates a pressure differential in an attachment mechanism and using the pressure differential in the attachment mechanism to attach a display portion to a surface.

In Example M2, the subject matter of any of the preceding 'M' Examples can optionally include where the display portion includes the pump and the attachment mechanism.

In Example M3, the subject matter of any of the preceding 'M' Examples can optionally include where the surface is a keyboard portion of an electronic device and the keyboard portion includes the pump and the attachment mechanism.

In Example M4, the subject matter of any of the preceding 'M' Examples can optionally include activating the pump when a proximity sensor detects that the display portion is proximate to the surface and re-activating the pump when a pressure sensor in the attachment mechanism detects that the pressure differential is below a threshold.

An example system S1 can include means for activating a pump, wherein the pump creates a pressure differential in an attachment mechanism and means for using the pressure differential in the attachment mechanism such that a display portion can be attached to a surface.

An example system SS1 can include a processor, a display portion, an attachment mechanism located on the display portion, and a pump located in the display portion that creates a pressure differential in the attachment mechanism such that the display portion can be attached to a surface.

In Example SS2, the subject matter of any of the preceding 'SS' Examples can optionally include a plurality of attachment mechanisms located on the display portion.

In Example SS3, the subject matter of any of the preceding 'SS' Examples can optionally include an orientation valve, wherein the orientation valve can direct the pressure differential created by a pump to at least one of the plurality of attachment mechanisms.

In Example SS4, the subject matter of any of the preceding 'SS' Examples can optionally include where the orientation valve allows the display portion to be attached to the surface in a landscape configuration and in a portrait configuration.

In Example SS5, the subject matter of any of the preceding 'SS' Examples can optionally include a hinge, wherein the hinge includes the attachment mechanism and the hinge can rotate at least ninety degrees.

Example X1 is a machine-readable storage medium including machine-readable instructions to implement a method or realize an apparatus as in any one of the Examples A1-A8, AA1-AA6, M1-M6. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device, comprising:
    a first housing, wherein the first housing includes a housing attachment that runs at least a portion of the length of the first housing;
    a plurality of attachment mechanisms located in the housing attachment; and
    a pump located in the first housing that creates a pressure differential in at least a portion of the plurality of attachment mechanisms such that a second housing can be removably attached to the first housing in or on the housing attachment in a landscape configuration; and
    a second pump, wherein the second pump creates a pressure differential in a portion of the plurality of attachment mechanisms when the second housing is attached to the first housing in a portrait configuration.

2. The electronic device of claim 1, wherein the plurality of attachment mechanisms are located on a chassis of the first housing.

3. The electronic device of claim 1, wherein the plurality of attachment mechanisms allow the second housing to be attached to the first housing in a landscape configuration or in a portrait configuration.

4. The electronic device of claim 1, wherein the second housing includes a display.

5. The electronic device of claim 1, further comprising:
    a sealing member around each of the plurality of attachment mechanisms.

6. The electronic device of claim 1, further comprising:
    a pressure sensor, wherein when the pressure differential is below a threshold, the pressure sensor activates the pump to increase the pressure differential in the plurality of attachment mechanisms.

7. The electronic device of claim 1, wherein the first housing includes a wireless module to wirelessly communicate with the second housing.

8. The electronic device of claim 1, wherein the second housing is a standalone electronic device.

9. A method, comprising:
    activating a pump located in a first housing, wherein the first housing includes a housing attachment that runs at least a portion of the length of the first housing, wherein the pump creates a pressure differential in a plurality of attachment mechanisms located in the housing attachment; and
    using the pressure differential in the plurality of attachment mechanisms to removably attach a second housing to a surface of the first housing, in a landscape configuration;
    removing the second housing from the first housing; and
    using the pressure differential in a second plurality of attachment mechanisms to reattach the second housing to the first housing in a portrait configuration, wherein the second plurality of attachment mechanisms is a portion of the plurality of attachment mechanisms.

10. The method of claim 9, wherein the plurality of attachment mechanisms are located on a chassis of the first housing.

11. The method of claim 9, wherein the number of the plurality of attachment mechanisms that have the pressure differential to allow the second housing to be attached to the first housing in a landscape configuration is greater than the number of the second plurality of attachment mechanisms that have the pressure differential to allow the second housing to be attached to the first housing in a portrait configuration.

12. The method of claim 9, wherein a second pump is activated instead of the pump, wherein the second pump creates a pressure differential in a portion of the plurality of attachment mechanisms when the second housing is attached to the first housing in a portrait configuration.

13. The method of claim 9, further comprising:
    activating the pump when a proximity sensor detects that the second housing is proximate to the surface of the first housing; and
    re-activating the pump when a pressure sensor detects that the pressure differential is below a threshold.

14. A system, comprising:
    a processor;
    a first housing, wherein the first housing includes a housing attachment that runs at least a portion of the length of the first housing;
    a plurality of attachment mechanisms located in the housing attachment; and
    a pump located in the first housing that creates a pressure differential in at least a portion of the plurality of attachment mechanisms such that a second housing can be removably attached to the first housing in or on the housing attachment in a landscape configuration; and a second pump, wherein the second pump creates a pressure differential in a portion of the plurality of attachment mechanisms when the second housing is attached to the first housing in a portrait configuration.

15. The system of claim 14, wherein the plurality of attachment mechanisms are located on a chassis of the first housing.

16. The system of claim 14, wherein the plurality of attachment mechanisms allow the second housing to be attached to the first housing in a landscape configuration or in a portrait configuration.

17. The system of claim 14, further comprising:

a pressure sensor in the attachment mechanism, wherein when the pressure differential is below a threshold, the pressure sensor activates the pump to increase the pressure differential in the plurality of attachment mechanisms.

18. The system of claim 14, wherein the first housing includes a wireless module to wirelessly communicate with the second housing.

* * * * *